(12) United States Patent
Liu et al.

(10) Patent No.: US 11,683,278 B2
(45) Date of Patent: Jun. 20, 2023

(54) SPECTROGRAM AND MESSAGE BAR GENERATION BASED ON AUDIO DATA IN AN INSTANT MESSAGING APPLICATION

(71) Applicant: Tencent Technology (Shenzhen) Company Limited, Guangdong (CN)

(72) Inventors: Liqiang Liu, Shenzhen (CN); Sha Sha, Shenzhen (CN); Jun Wu, Shenzhen (CN); Qinghua Zhong, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 31 days.

(21) Appl. No.: 17/317,389

(22) Filed: May 11, 2021

(65) Prior Publication Data

US 2021/0266274 A1   Aug. 26, 2021

Related U.S. Application Data

(63) Continuation of application No. PCT/CN2020/083485, filed on Apr. 7, 2020.

(30) Foreign Application Priority Data

Apr. 12, 2019 (CN) .......................... 201910295763.6

(51) Int. Cl.
*G06F 3/04847* (2022.01)
*G06F 3/16* (2006.01)
*H04L 51/04* (2022.01)

(52) U.S. Cl.
CPC .......... *H04L 51/04* (2013.01); *G06F 3/04847* (2013.01); *G06F 3/167* (2013.01)

(58) Field of Classification Search
CPC ..... H04L 51/04; G06F 3/04847; G06F 3/167; G06F 3/165
See application file for complete search history.

(56) References Cited

U.S. PATENT DOCUMENTS

| 8,660,545 | B1 * | 2/2014 | Redford ................. H04W 4/50 |
|           |      |        | 455/418 |
| 2008/0091425 | A1 | 4/2008 | Kane |

(Continued)

FOREIGN PATENT DOCUMENTS

| CN | 102780653 | 11/2012 |
| CN | 105931657 | 9/2016 |

(Continued)

OTHER PUBLICATIONS

International Search Report dated Jul. 8, 2020 in PCT Application PCT/CN2020/083485, filed Apr. 7, 2020 (with English Translation).

(Continued)

*Primary Examiner* — Tan H Tran
(74) *Attorney, Agent, or Firm* — ArentFox Schiff LLP

(57) ABSTRACT

In a data processing method that based on an instant messaging application and which is performed by a data processing device, audio data from an instant messaging application is obtained, and sampled volume data corresponding to the audio data is obtained based on a sampling frequency. A spectrogram corresponding to the audio data is generated according to the audio data and the sampled volume data, and a message bar comprising the spectrogram and the audio data is outputted. Audio progress control is then performed on the audio data in response to a target trigger operation on the message bar, and display control is performed on the spectrogram based on an audio progress.

20 Claims, 13 Drawing Sheets

(56) References Cited

U.S. PATENT DOCUMENTS

| | | | | |
|---|---|---|---|---|
| 2010/0159892 | A1* | 6/2010 | Dunnam | H04M 1/6505 |
| | | | | 455/413 |
| 2013/0061144 | A1* | 3/2013 | Eppolito | G06F 3/04847 |
| | | | | 715/716 |
| 2013/0064379 | A1* | 3/2013 | Pardo | H04S 7/40 |
| | | | | 381/56 |
| 2015/0019969 | A1* | 1/2015 | Lee | G11B 27/34 |
| | | | | 715/719 |
| 2015/0312175 | A1* | 10/2015 | Langholz | H04L 51/066 |
| | | | | 715/752 |
| 2016/0239165 | A1* | 8/2016 | Chen | H04L 51/24 |
| 2016/0253434 | A1 | 9/2016 | Yu | |
| 2016/0275075 | A1 | 9/2016 | Yu | |
| 2016/0328105 | A1* | 11/2016 | Chandra | G06F 3/0488 |
| 2019/0139280 | A1* | 5/2019 | Hubel | G06V 30/412 |
| 2019/0362022 | A1* | 11/2019 | Haukioja | G10L 15/04 |

FOREIGN PATENT DOCUMENTS

| | | |
|---|---|---|
| CN | 107395352 | 11/2017 |
| CN | 107481723 A | 12/2017 |
| CN | 107592415 | 1/2018 |
| CN | 107623614 A | 1/2018 |
| CN | 107844470 A | 3/2018 |
| CN | 108347512 A | 7/2018 |

OTHER PUBLICATIONS

Written Opinion dated Jul. 8, 2020 in PCT Application PCT/CN2020/083485, filed Apr. 7, 2020.

Chinese Office Action dated Mar. 2, 2022 in Application No. 201910295763.6 with English Translation.

OQTN Qiangrou, "How to set QQ voice print bubbles, How to set mobile phone QQ voice voiceprint bubbles setting method" QQTN.com, URL: https://www.qqtn.com/article/article_172257_1.html, 10 Pages, with English Translation.

* cited by examiner

SPECTROGRAM AND MESSAGE BAR GENERATION BASED ON AUDIO DATA IN AN INSTANT MESSAGING APPLICATION

RELATED APPLICATIONS

This application is a continuation of International Application No. PCT/CN2020/083485, filed on Apr. 7, 2020, which claims priority to Chinese Patent Application No. 201910295763.6, entitled "DATA PROCESSING METHOD AND APPARATUS BASED ON INSTANT MESSAGING APPLICATION" filed on Apr. 12, 2019. The entire disclosures of the prior applications are hereby incorporated by reference in their entirety.

FIELD OF THE TECHNOLOGY

This disclosure relates to the field of Internet technologies, including a data processing method, apparatus, and device based on an instant messaging application, and a storage medium.

BACKGROUND OF THE DISCLOSURE

With the development of the Internet, more users chat by using an instant messaging application. A voice message function in the instant messaging application has become a daily demand for users of all ages thanks to simple operation and natural communication.

In a current chat scenario of an instant messaging application, when a user receives a voice message, the duration of the voice message may be displayed in a message bar, and the user may be provided with a function of clicking to play the voice message. It can be seen that only the duration of the voice message is displayed in the message bar, and a presentation form of the voice message is excessively monotonous. For the received voice message, the operation manner of clicking to play and listen to the voice message is also excessively monotonous.

SUMMARY

In an exemplary aspect, in a data processing method that based on an instant messaging application and which is performed by a data processing device, audio data from an instant messaging application is obtained, and sampled volume data corresponding to the audio data is obtained based on a sampling frequency. A spectrogram corresponding to the audio data is generated according to the audio data and the sampled volume data, and a message bar comprising the spectrogram and the audio data is outputted. Audio progress control is then performed on the audio data in response to a target trigger operation on the message bar, and display control is performed on the spectrogram based on an audio progress.

In an exemplary aspect, a data processing apparatus including an instant messaging application, including processing circuitry that obtains audio data from an instant messaging application, and obtains sampled volume data corresponding to the audio data based on a sampling frequency. The processing circuitry generates a spectrogram corresponding to the audio data according to the audio data and the sampled volume data, and outputs a message bar comprising the spectrogram and the audio data. The processing circuitry performs audio progress control on the audio data in response to a target trigger operation on the message bar, and performs display control on the spectrogram based on an audio progress.

In an exemplary aspect, a non-transitory computer-readable storage medium, stores instructions that, when executed by a least one processor, cause the at least one processor to obtain audio data from an instant messaging application, and obtain sampled volume data corresponding to the audio data based on a sampling frequency. The at least one processor is also caused to generate a spectrogram corresponding to the audio data according to the audio data and the sampled volume data, and output a message bar comprising the spectrogram and the audio data. The at least one processor is then caused to perform audio progress control on the audio data in response to a target trigger operation on the message bar, and perform display control on the spectrogram based on an audio progress.

BRIEF DESCRIPTION OF THE DRAWINGS

To describe the technical solutions of the embodiments of this application or the existing technology more clearly, the following briefly introduces the accompanying drawings for ease of understanding of the exemplary embodiments. As can be appreciated, the accompanying drawings illustrate only exemplary embodiments of this disclosure, and a person of ordinary skill in the art will recognize that other embodiments are possible without departing from the scope of the disclosure.

DETAILED DESCRIPTION

The technical solutions in the exemplary embodiments of this disclosure are described in the following with reference to the accompanying drawings. As can be appreciated, the embodiments described herein are merely exemplary and other embodiments are possible without departing from the scope of the present disclosure.

Figure 1:
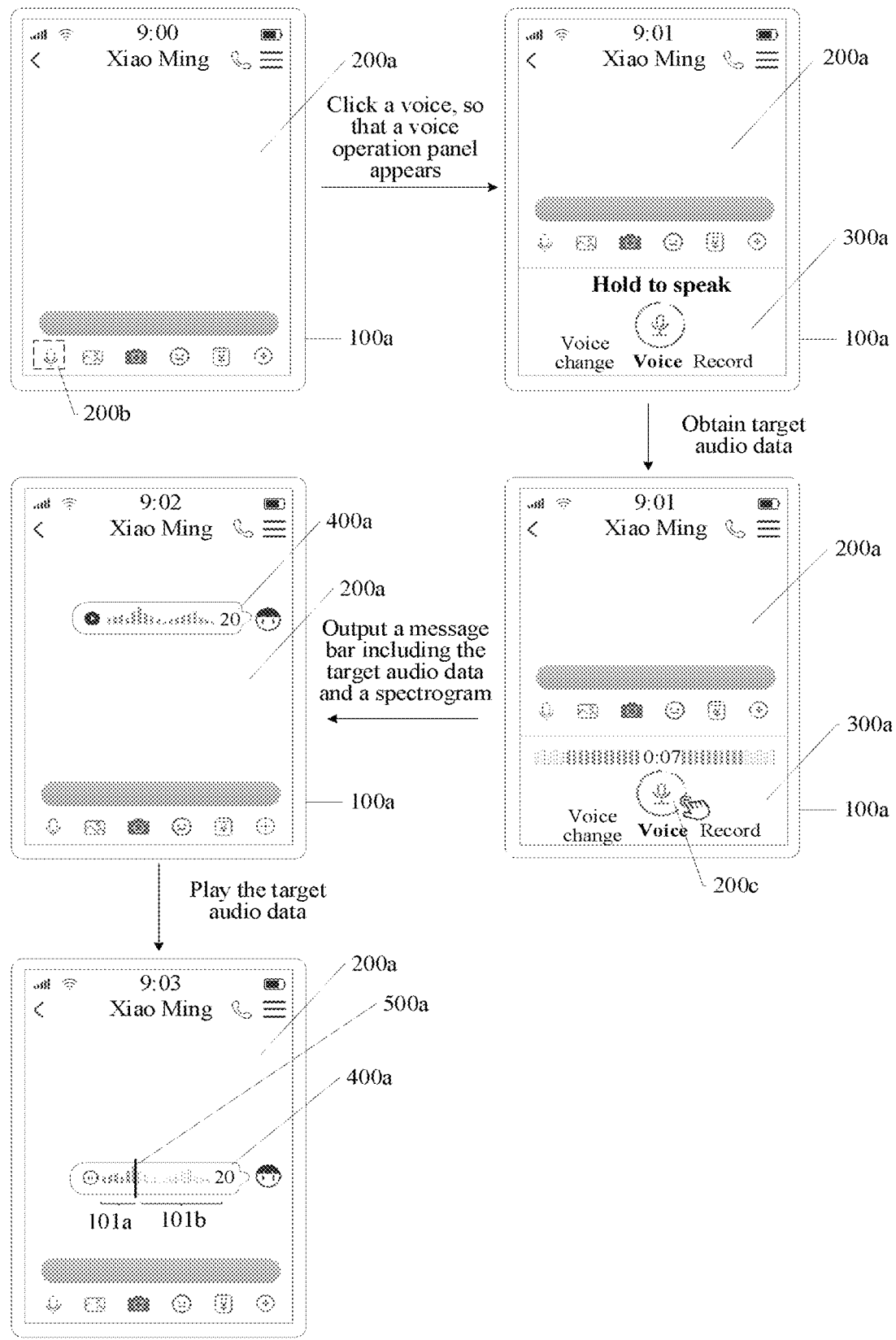
FIG. 1 is a schematic scenario diagram of a data processing method based on an instant messaging application according to an exemplary embodiment of this disclosure.

FIG. 1 is a schematic scenario diagram of a data processing method based on an instant messaging application according to an exemplary embodiment of this disclosure. As shown in FIG. 1, a user may open an instant messaging application (for example, QQ and WeChat) on a terminal device 100a, and click a chat window 200a corresponding to any contact in the instant messaging application. In the chat window 200a, after the user clicks a voice icon 200b, a voice operation panel 300a may be displayed at the bottom in the chat window 200a. In the voice operation panel 300a, a plurality of voice modes (for example, a voice mode, a voice change mode, and a voice recording mode) are provided for selection by the user. If the user selects the voice mode, the user may press and hold the voice icon with a finger and speak into a microphone of the terminal device 100a. Meanwhile, the instant messaging application may record a voice of the user in real time and display duration information (for example, 0:07) of the recorded voice in the voice operation panel 300a. When the user releases the finger, the recorded voice may be used as audio data, a corresponding first spectrogram is generated according to the audio data, and a message bar including the audio data and the first spectrogram is displayed at a local end. At the same time, the audio data is also sent to a contact (the user may be referred to as a sender of the audio data and the contact may be referred to as a receiver of the audio data) corresponding to the chat window 200a, a receiving end of the contact may also generate a corresponding second spectrogram according to the received audio data, and a message bar including the audio data and the second spectrogram is displayed at the receiving end. Voice information included in the message bar displayed at the local end is identical with voice information included in the message bar displayed at the receiving end. However, spectrograms, that is, the first spectrogram and the second spectrogram, displayed in the message bar may be the same or may be different. When message bar display types used at the local end and the receiving end are different, display colors of the first spectrogram and the second spectrogram are different. A chat window 200a of a client corresponding to the user is used as an example. A message bar 400a corresponding to the audio data may be displayed in the chat window 200a. A spectrogram corresponding to the audio data may be displayed in the message bar 400a, that is, the volume of sound in the audio data and the pitch of sound in the audio data may be displayed. The user may play the audio data by clicking the message bar 400a, a playback progress of the audio data may be recorded in real time during playing, and a progress indicator slider 500a is displayed in the message bar 400a according to a voice playback progress. The progress indicator slider 500a may divide the spectrogram corresponding to the audio data into two regions, which are respectively a voiceprint region (that is, a spectrogram region 101a) corresponding to a played voice and a voiceprint region (that is, a spectrogram region 101b) corresponding to an unplayed voice, and the voiceprint region corresponding to the played voice and the voiceprint region corresponding to the unplayed voice have different display colors. The user may quickly determine voice playback progress information according to the progress indicator slider 500a and color information. The user may pause currently played audio data through click, and when the message bar 400a corresponding to the audio data is clicked again, the voice may continue to be played from a pause node corresponding to the audio data. For example, duration corresponding to audio data is 1:15. If the user clicks to pause the playback when the audio data is played to a moment 0:20 and clicks the message bar 400a corresponding to the audio data again, the audio data may continue to be played from the moment 0:20.

The terminal device 100a may include a mobile phone, a tablet computer, a notebook computer, a palmtop computer, a mobile Internet device (MID), a point of sale (POS) machine, a wearable device (for example, a smart watch or a smart band), or another terminal device with a function of installing an instant messaging application.

Figure 2:
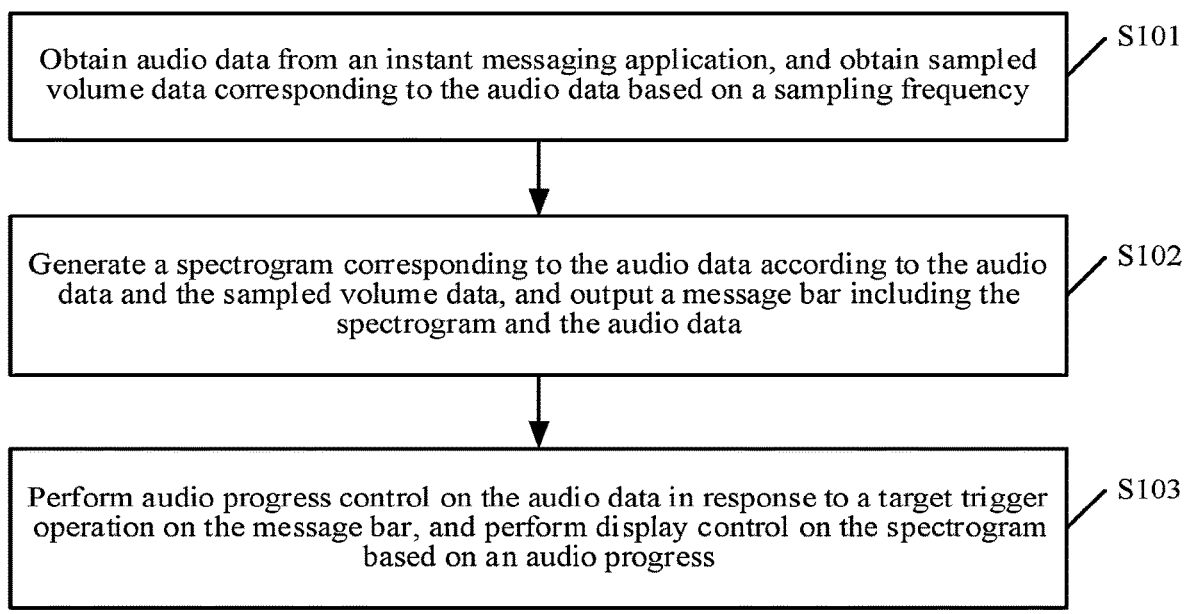
FIG. 2 is a schematic flowchart of a data processing method based on an instant messaging application according to an exemplary embodiment of this disclosure.

FIG. 2 is a schematic flowchart of a data processing method based on an instant messaging application according to an exemplary embodiment of this disclosure. As shown in FIG. 2, the method may be performed by a data processing device based on an instant messaging application shown in FIG. 12 and includes the following steps.

In step S101, audio data is obtained from an instant messaging application, and sampled volume data corresponding to the audio data is obtained based on a sampling frequency.

Specifically, a terminal device may include a sending end and a receiving end, the sending end may directly record sound data of a user as audio data in an instant messaging application, and the receiving end may use voice data received from the sending end as audio data. When a user clicks a voice icon in a chat window of the instant messaging application to enter a voice operation panel, selects a required voice mode, and presses and holds the voice icon to speak, the terminal device may record sound data of the user in real time, and use the recorded sound data of the user as audio data. When the user selects a voice change mode, the audio data is sound data obtained after the user changes the sound. On the terminal device, a digital expression manner of audio data varies in different operating systems. Therefore, acquired audio data needs to be uniformly converted into decibel data ranging from 0 to 255. For example, in an operating system of a terminal, an interval corresponding to acquired sound data is [0, 1]. Therefore, the sound data acquired by the terminal needs to be converted into decibel data within an interval of [0, 255]. After the audio data is converted, a sampling frequency corresponding to the audio data is determined, and sound sampling is performed on the audio data based on the sampling frequency, to obtain sampled volume data, that is, after the audio data is converted into decibel data, sound sampling is performed. For obtained audio data, sound sampling may be first performed on the audio data based on a sampling frequency, and after sampled volume data is obtained, the sampled volume data is converted into decibel data ranging from 0 to 255, that is, after sound sampling is performed on the audio data, the sampled volume data is converted into the decibel data. For example, when the sampling frequency is 100 times per second, it means that 100 sound data points may be sampled per second from audio data.

In step S102, a spectrogram corresponding to the audio data is generated according to the audio data and the sampled volume data, and a message bar including the spectrogram and the audio data is outputted.

Specifically, the terminal device may obtain audio duration corresponding to the audio data, determine a quantity of voiceprint points corresponding to the audio data according to the audio duration, to determine audio duration corresponding to each voiceprint point in the audio data, and determine a height corresponding to the each voiceprint point according to sampled volume data in the audio duration corresponding to the each voiceprint point. In other words, the height of the voiceprint point is related to the volume of sound in the sampled volume data. Within a preset volume range (for example, a common volume range of a user voice), when the volume of sound is higher, the height corresponding to the voiceprint point is larger. To ensure the readability and visual beauty of a message bar, when the volume of sound in the sampled volume data is less than the preset volume range (for example, 60 decibels to 150 decibels), the height corresponding to the voiceprint point is minimum. When the volume of sound in the sampled volume data is greater than the preset volume range, the height corresponding to the voiceprint point is maximum. The terminal device may generate a spectrogram corresponding to the audio data according to the determined quantity of voiceprint points and the height corresponding to each voiceprint point, and output a message bar including the spectrogram and the audio data in a chat window of the instant messaging application. The spectrogram is to perform visualized information display on the audio data by using a pattern, that is, a location of a voiceprint element and pitches in the audio data are expressed by using the spectrogram (in the spectrogram, a height of a voiceprint point may be represented as the volume of sound in the audio data, and a change trend of the height of the voiceprint point may be represented as a change trend of the volume of sound in the audio data). Therefore, the volume of sound and a sound change of the audio data can be perceived according to the spectrogram, and the user can quickly determine an operation manner (for example, an earpiece mode, a hands free mode, and a silent state) of a message bar including the audio data. If a height corresponding to a voiceprint point is relatively low in a spectrogram, the message bar may be operated in the hands free mode. If the height corresponding to the voiceprint point is relatively high in the spectrogram, the message bar may be operated in the silent state or the earpiece mode.

In step S103, audio progress control is performed on the audio data in response to a target trigger operation on the message bar, and display control is performed on the spectrogram based on an audio progress.

Specifically, the terminal device may perform audio progress control on the audio data in response to a target trigger operation of a user on the message bar, and perform display control on the spectrogram based on an audio progress, that is, may record progress information of the audio data in real time, and display, in the message bar including the audio data, a progress of read audio data and a progress of unread audio data in the audio data according to the progress information. The target trigger operation may include a playback trigger operation, a pause trigger operation, and a drag trigger operation, or may include a voice-to-text trigger operation, a translation trigger operation, or the like.

Figure 3A:
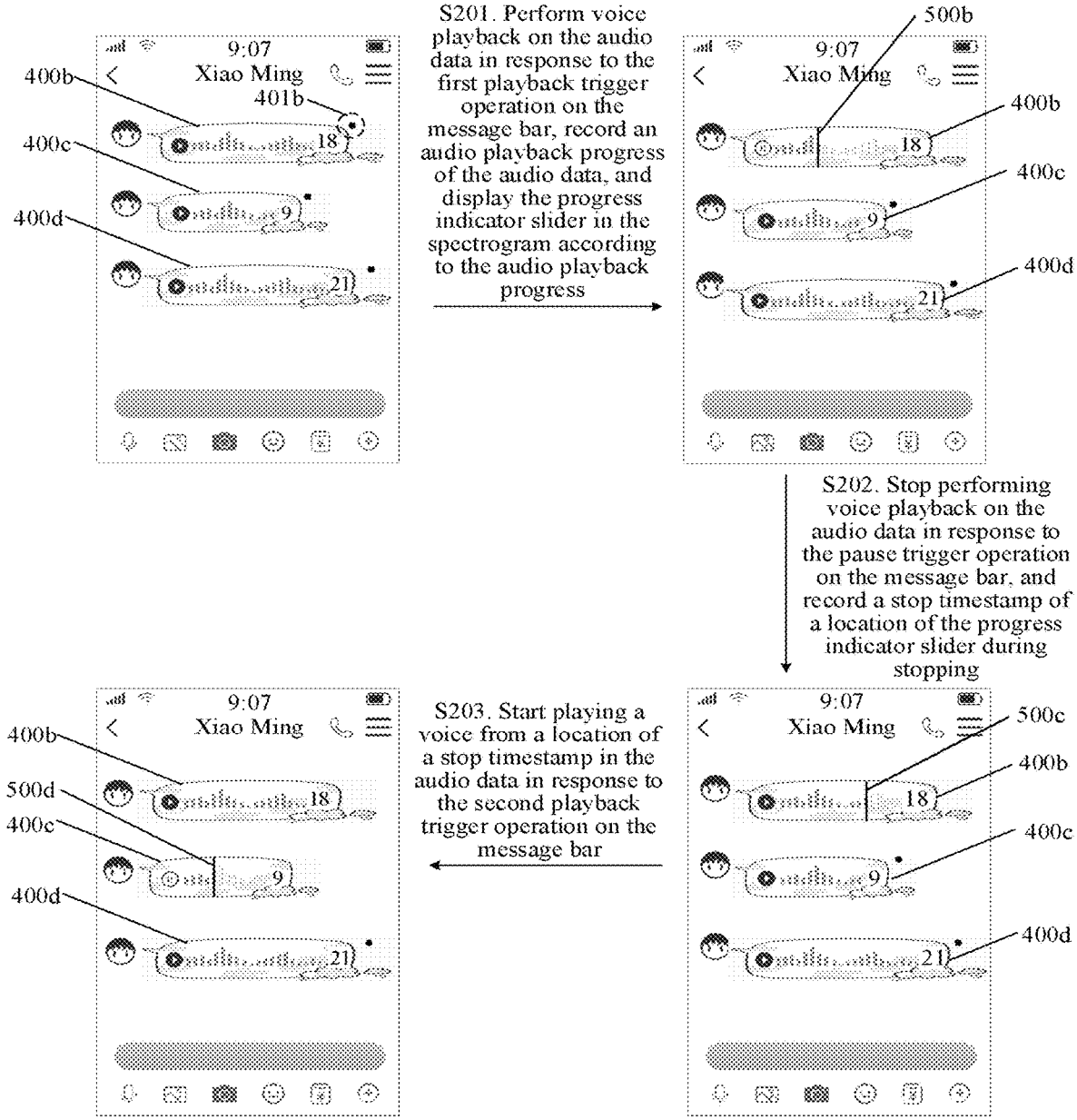
FIG. 3a is a schematic diagram of an interface in response to a target trigger operation on a message bar according to an exemplary embodiment of this disclosure.
Figure 3B:
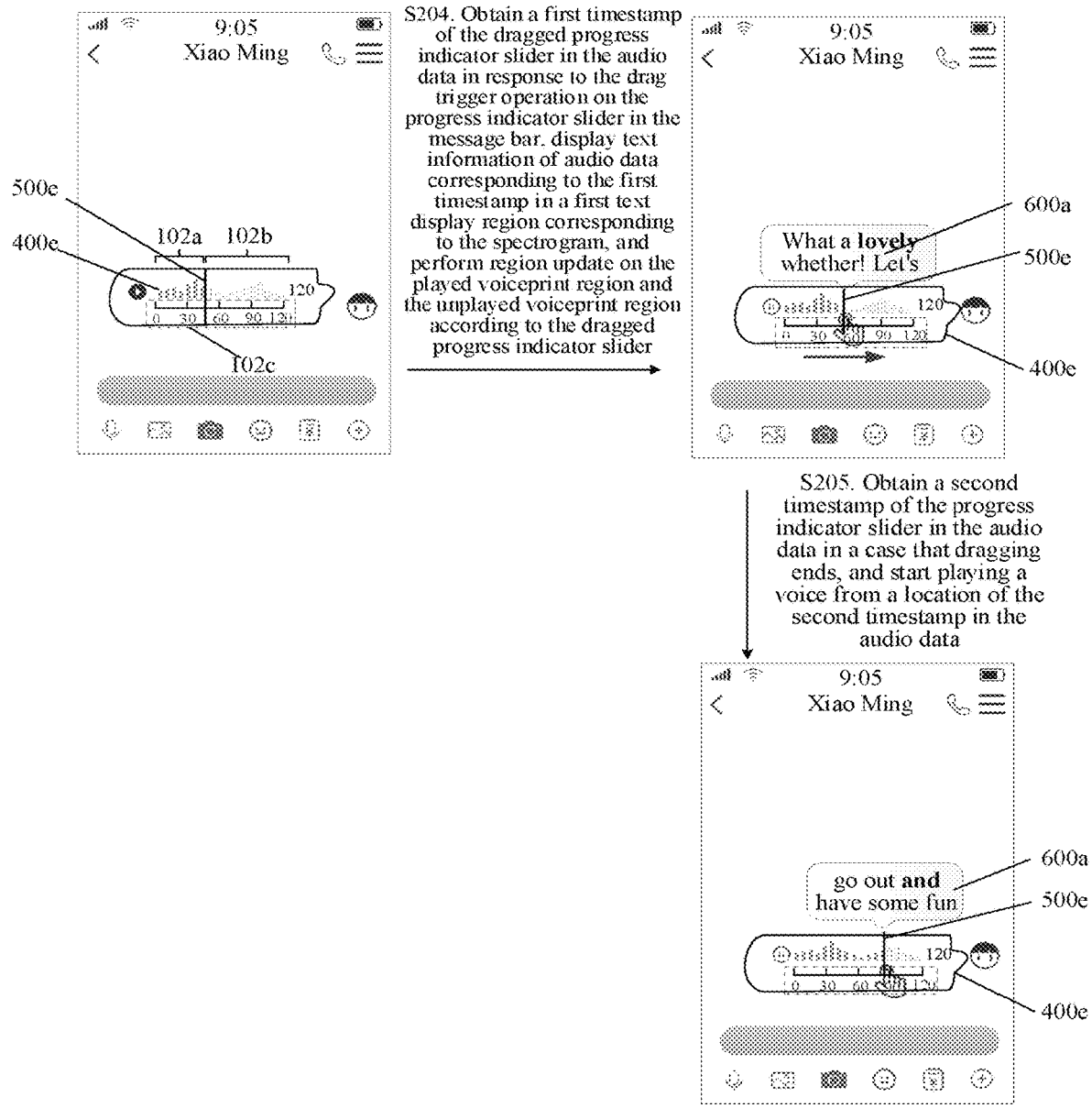
FIG. 3b is another schematic diagram of an interface in response to a target trigger operation on a message bar according to an exemplary embodiment of this disclosure.
Figure 3C:
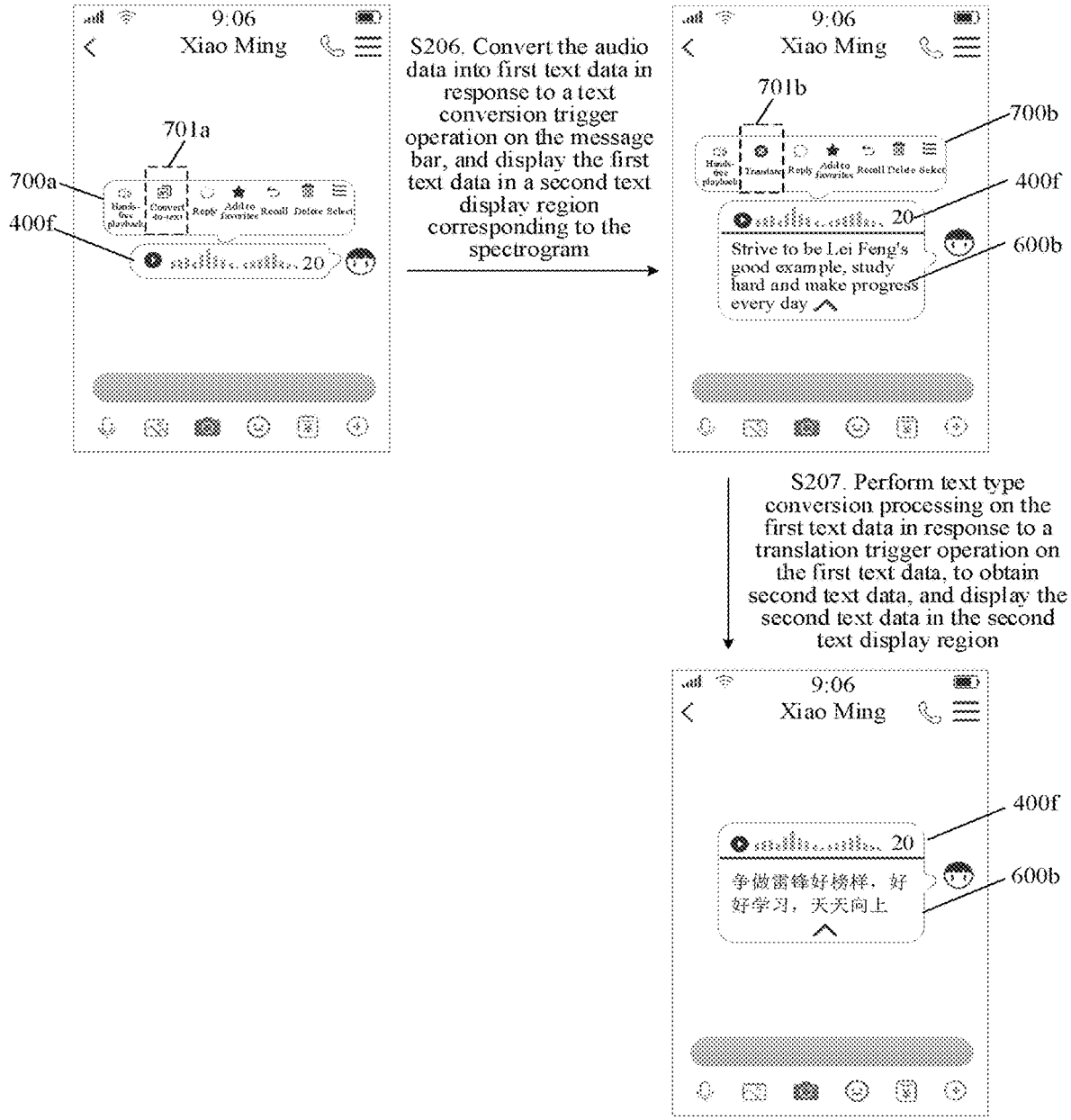
FIG. 3c is a further schematic diagram of an interface in response to a target trigger operation on a message bar according to an exemplary embodiment of this disclosure.

Further, FIG. 3a to FIG. 3c are schematic diagrams of an interface in response to a target trigger operation on a message bar according to an exemplary embodiment of this disclosure. As shown in FIG. 3a to FIG. 3c, step S201 to step S207 are detailed descriptions of step S103 in the foregoing embodiment corresponding to FIG. 2, that is, step S201 to step S207 are a specific procedure of responding to a target trigger operation on a message bar according to an embodiment of this application.

When the target trigger operation includes a first playback trigger operation, a pause trigger operation, or a second playback trigger operation, as shown in FIG. 3a, the responding to a target trigger operation may include the following steps.

In step S201, voice playback is performed on the audio data in response to the first playback trigger operation on the message bar, an audio playback progress of the audio data is recorded, and the progress indicator slider is displayed in the spectrogram according to the audio playback progress.

Specifically, in a chat window of an instant messaging application, if a user receives a plurality of pieces of voice information, that is, a plurality of pieces of audio data, message bars such as a message bar 400b, a message bar 400c, and a message bar 400d corresponding to the plurality of voice messages are displayed in the chat window. For audio data that is not read by the user, the instant messaging application may identify a message bar corresponding to the unread audio data. For example, before the user reads audio data included in the message bar 400b, a small dot may be displayed in an identification region 401b to identify the message bar 400b. When the user clicks to play the audio data included in the message bar 400b, the terminal device may perform voice playback on the audio data in the message bar 400b in response to a playback trigger operation, or referred to as the first playback trigger operation, on the message bar 400b, and may clear an identifier corresponding to the message bar 400b, that is, clear the small dot in the identification region 401b. During voice playback, an audio playback progress of the audio data may be recorded, and a progress indicator slider 500b is displayed in a spectrogram included in the message bar 400b according to the audio playback progress. The progress indicator slider 500b may be used for distinguishing a played voiceprint region from an unplayed voiceprint region in the spectrogram, and the played voiceprint region and the unplayed voiceprint region have different display manners (for example, different colors may be displayed).

In step S202, voice playback on the audio data is stopped in response to the pause trigger operation on the message bar, and a stop timestamp of a location of the progress indicator slider during stopping is recorded.

Specifically, when the audio data included in the message bar 400b is being played, the user may click to pause playing the audio data. When the user clicks to pause, the terminal device may stop performing voice playback on the audio data in the message bar 400b in response to a pause trigger operation on the message bar 400b, and record a stop timestamp corresponding to a progress indicator slider 500c when the playing of the audio data stops, that is, record a moment when the playing of the audio data stops. If audio duration corresponding to audio data is two minutes, and the audio data is playing to a moment 0:30 when the user clicks to stop playing, the stop timestamp of a location of the progress indicator slider 500*c* is the moment 0:30 in the audio data.

In step S203, a voice is played from a location of a stop timestamp in the audio data in response to the second playback trigger operation on the message bar.

Specifically, for the message bar 400*b* that is paused, the user may click to play again. When the user clicks the message bar 400*b* to play again, the terminal device may start playing a voice from a location of the stop timestamp in the audio data included in the message bar 400*b*, that is, start playing the audio data included in the message bar 400*b* from the pause, in response to a further playback trigger operation, or referred to as a second playback trigger operation (the second playback trigger operation herein is used for distinguishing from the first playback trigger operation in step S201), on the message bar 400*b*. When the audio data included in the message bar 400*b* is played completely, audio data in the next message bar 400*c* may be automatically played, and when the audio data included in the message bar 400*c* is played, the audio playback progress corresponding to the audio data included in the message bar 400*b* may be cleared, that is, only one audio playback progress corresponding to one piece of audio data is stored in a client. Similarly, when the audio data included in the message bar 400*c* is played completely, audio data included in the message bar 400*d* may be automatically played until all unread audio data in the chat window of the user is played, or playing of the voice stops in response to a pause trigger operation on the message bar corresponding to the audio data.

When the target trigger operation includes a drag trigger operation, as shown in FIG. 3*b*, the responding to a target trigger operation may include the following steps.

In step S204, a first timestamp of the dragged progress indicator slider in the audio data is obtained in response to the drag trigger operation on the progress indicator slider in the message bar, text information of audio data corresponding to the first timestamp is displayed in a first text display region corresponding to the spectrogram, and region update is performed on the played voiceprint region and the unplayed voiceprint region according to the dragged progress indicator slider.

Specifically, the user may alternatively press and hold a progress indicator slider in a message bar and drag the progress indicator slider, so that audio data included in the message bar may be played at any time. When the user presses and holds a progress indicator slider 500*e* in a message bar 400*e* and drags the progress indicator slider, the terminal device may obtain a first timestamp of the progress indicator slider 500*c* in audio data included in the message bar 400*e* during dragging, that is, record an audio progress of the progress indicator slider 500*e* during dragging, in response to a drag trigger operation of the user on the progress indicator slider 500*e*, and display text information of audio data corresponding to the first timestamp in a first text display region 600*a* in the spectrogram, that is, display text field content of a current progress in real time when the user drags the progress indicator slider, so that the user may determine an accurate stop location of the progress indicator slider 500*e* according to the text field content. For example, audio duration corresponding to audio data is two minutes, if after playing the audio data, the user wants to play part of voice content in the audio data again, to avoid the waste of time (it takes two minutes to replay the entire piece of audio data), the user may press and hold a progress indicator slider in a message bar corresponding to the audio data and drag the progress indicator slider, and determine a specific location, that is, a location of voice content that the user wants to play again, of the progress indicator slider according to text field content in a dragging process. In addition, in people's habit of speaking, the modal particle of a sentence (that is, the end of a sentence) is usually low in volume. Because a height corresponding to a voiceprint bar in a spectrogram may indicate a volume, the user may alternatively determine the accurate stop location of the progress indicator slider 500*e* according to the height of the voiceprint bar, so that the user can start playing from a next complete sentence instead of starting to listen from the middle of a sentence. During dragging, a played voiceprint region and an unplayed voiceprint region in the spectrogram may be updated in real time according to the dragged progress indicator slider 500*e*. In other words, when the progress indicator slider 500*e* is dragged to a spectrogram region 102*a*, a dragged voiceprint interval may be determined as the unplayed voiceprint region, and when the progress indicator slider 500*e* is dragged to a spectrogram region 102*b*, a dragged voiceprint interval may be determined as the played voiceprint region.

A scale may be alternatively displayed in the message bar. For example, a scale 102*c* is displayed in the message bar 400*e*. In the scale 102*c*, a timescale in the scale 102*c* may be determined according to audio duration corresponding to the audio data included in the message bar 400*e*. For example, the audio duration corresponding to the audio data included in the message bar 400*e* is 120 s, and corresponding time information may be displayed in the scale 102*c*, so that the user may determine the accurate stop location of the progress indicator slider 500*e* according to time.

In step S205, a second timestamp of the progress indicator slider in the audio data is obtained in a case that dragging ends, and a voice is played from a location of the second timestamp in the audio data.

Specifically, when the user stops dragging, the terminal device may obtain a second timestamp of the progress indicator slider 500*e* in the audio data included in the message bar 400*e* in a case that dragging ends, that is, a timestamp when dragging stops, and start playing a voice from a location of the second timestamp in the audio data included in the message bar 400*e*. For example, when the user drags the progress indicator slider 500*e* from a moment 0:30 in the audio data to a moment 0:50 and stops dragging at the moment 0:50, a voice may be played at the moment 0:50 of the audio data.

If the user is playing target audio data in the message bar 400*e* before dragging the progress indicator slider 500*e*, the target audio data may be played normally according to a voice playback progress before the dragging when the user drags the progress indicator slider 500*e*. As soon as the dragging of the progress indicator slider 500*e* is stopped, a jump is made to a moment at which the dragging of the progress indicator slider 500*e* is stopped to perform voice playback. In a case that the audio data in the message bar 400*e* is played, the voice playback may be paused when the user drags the progress indicator slider 500*e*. As soon as the dragging of the progress indicator slider 500*e* is stopped, a jump is made to a moment at which the dragging of the progress indicator slider 500*e* is stopped to perform voice playback.

For the message bar including the audio data and the spectrogram, the target trigger operation may alternatively include a text conversion trigger operation or a translation trigger operation. As shown in FIG. 3*c*, the responding to a target trigger operation may include the following steps:

In step S206, the audio data is converted into first text data in response to a text conversion trigger operation on the message bar, and the first text data is displayed in a second text display region corresponding to the spectrogram.

Specifically, when it is inconvenient for the user to listen to a voice message, the user may long press a message bar to select a convert-to-text function to convert audio data into text information for display, so that the user reads the voice message by viewing the text information. As shown in FIG. 3c, when the user long presses a message bar 400f, a menu window 700a may pop up in a corresponding region of the message bar 400f, and the user may select a convert-to-text option 701a in the menu window 700a. After the user clicks the convert-to-text option 701a, the terminal device may perform speech recognition on audio data included in the message bar 400f in response to a text conversion trigger operation of the user on the message bar 400f, to obtain text information, or referred to as first text data, corresponding to the audio data, and display the first text data in a second text display region 600b corresponding to the spectrogram. When the instant messaging application provides the convert-to-text option 701a for the audio data, it indicates that the instant messaging application has a convert-to-text function. The convert-to-text function is to convert audio data into corresponding text information. For example, if voice information in audio data is Chinese, the convert-to-text function may convert the audio data into Chinese character text information. If the voice information in the audio data is English, the convert-to-text function may convert the audio data into English information. If the voice information in the audio data is a dialect (for example, Hunan dialect, Chongqing dialect, and Cantonese), the convert-to-text function may recognize the dialect in the audio data and convert the audio data into Chinese character text information.

In step S207, text type conversion processing is performed on the first text data in response to a translation trigger operation on the first text data, to obtain second text data, and the second text data is displayed in the second text display region.

Specifically, when target audio information received by the user is a voice in a foreign language (for example, Russian and German), and after the target audio information is converted into first text data (the first text data is foreign language text information) through the convert-to-text function, the user cannot understand content in the first text data. The user may long press the first text data in the second text display region 600b, a menu window 700b may pop up in a corresponding region of the message bar 400f, and the user may select a translation option 701b in the menu window 700b. After the user clicks the translation option 701b and selects a translation language type, the terminal device may perform text type conversion processing (that is, translation) on the first text data in response to a translation trigger operation of the user on the first text data, to obtain second text data matching the translation language type selected by the user, and replace the first text data with the second text data in the second text display region 600b, that is, display translated text information in the second text display region 600b. The translation function can implement mutual translation between a plurality of language types. For example, Chinese may be translated into English, Japanese, German, or the like, English, Japanese, and German may be translated into Chinese, or the like, or English may be translated into German, Italian, or the like.

In an exemplary embodiment of this disclosure, audio data may be obtained from an instant messaging application, and sampling is performed on the audio data to obtain sampled volume data. A quantity of voiceprint points may be determined according to audio duration of the audio data, a height corresponding to each voiceprint point is determined according to the sampled volume data, and a spectrogram corresponding to the audio data may be generated according to the quantity of voiceprint points and the height corresponding to the each voiceprint point. A message bar including the spectrogram and the audio data is outputted in the instant messaging application, an audio progress of the audio data may be recorded in response to a trigger operation on the message bar, and display control is performed on the spectrogram based on the audio progress. It can be seen that in a chat scenario in an instant messaging application, a spectrogram corresponding to audio data is displayed in a message bar, and a user may click the message bar to play/pause a voice, determine a sound region by using the visualized spectrogram, adjust a voice progress by sliding, and watch a text translation corresponding to the voice in real time when the progress is adjusted, to increase the diversity of display forms of the audio data and enrich operation manners of the audio data. In addition, the user can efficiently listen to, watch, and operate a voice message, so that the interactivity, readability, and efficiency of the voice message are greatly enhanced, and the convenient use of the voice message by the user in the instant messaging application is better promoted.

Figure 4:
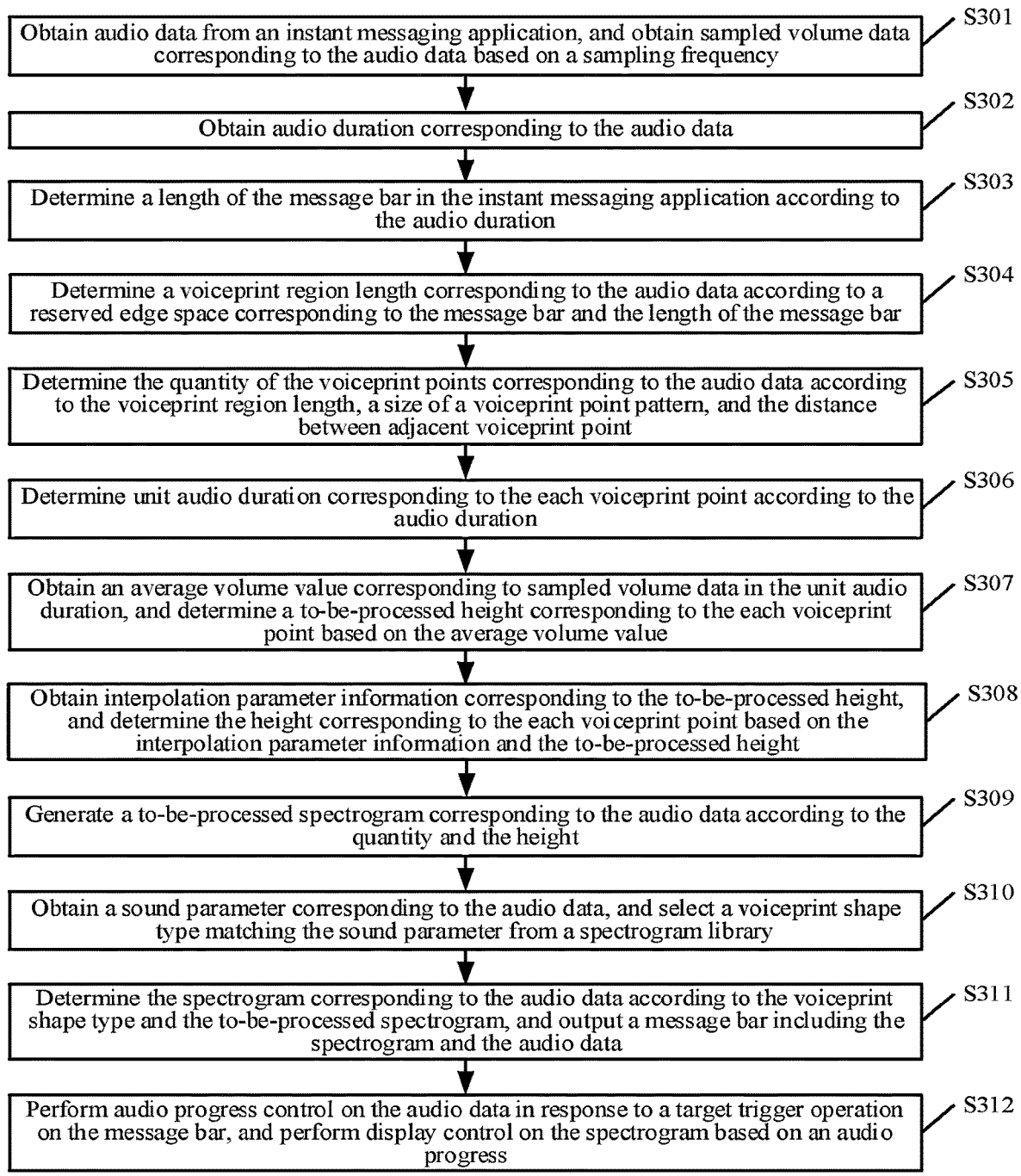
FIG. 4 is a schematic flowchart of another data processing method based on an instant messaging application according to an exemplary embodiment of this disclosure.
Figure 12:
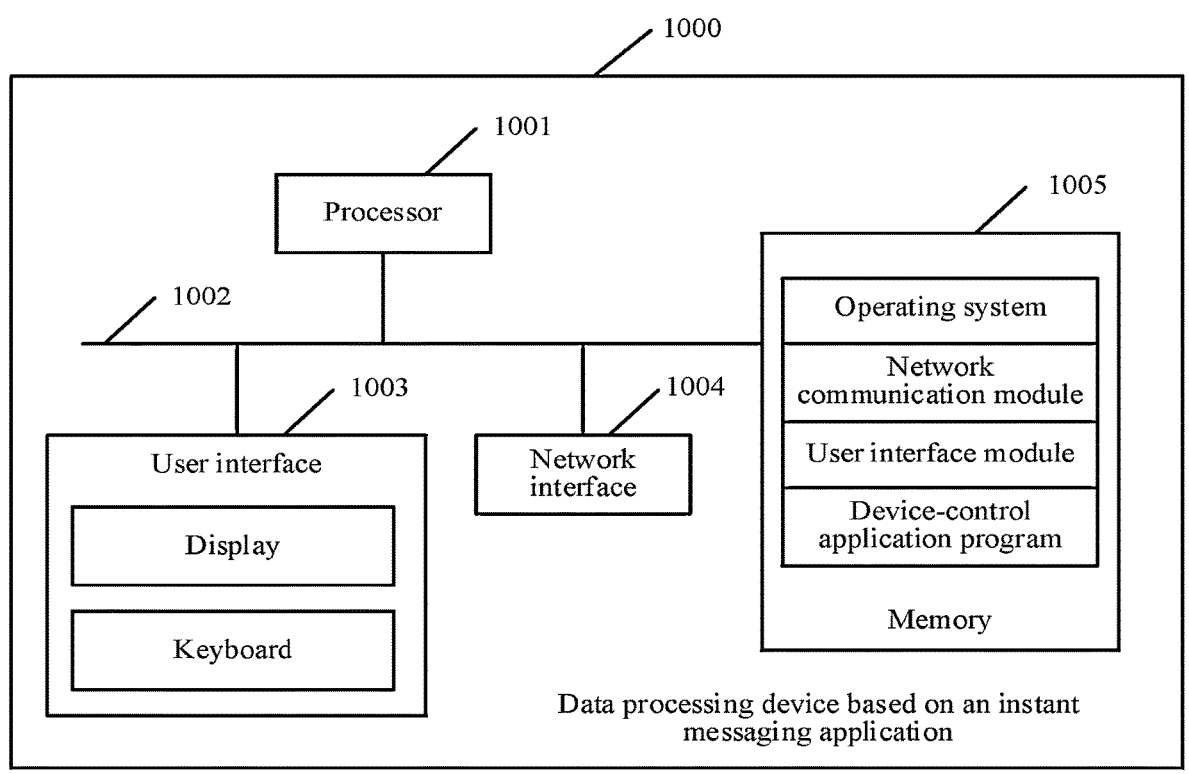
FIG. 12 is a schematic structural diagram of a data processing device based on an instant messaging application according to an exemplary embodiment of this disclosure.

FIG. 4 is a schematic flowchart of another data processing method based on an instant messaging application according to an exemplary embodiment of this disclosure. As shown in FIG. 4, the method may be performed by a data processing device based on an instant messaging application as shown in FIG. 12 and includes the following steps.

In step S301, audio data is obtained from an instant messaging application, and sampled volume data corresponding to the audio data is obtained based on a sampling frequency.

For a specific implementation process of step S301, reference may be made to the description about step S101 in the foregoing exemplary embodiment corresponding to FIG. 2. Details are not described herein again.

In step S302, audio duration corresponding to the audio data is obtained.

Specifically, after obtaining audio data from an instant messaging application, the terminal device may obtain audio duration, that is, duration information from the moment when a user presses and holds a voice icon in a voice operation panel of the instant messaging application to speak to the moment when the user releases the voice icon, corresponding to the audio data.

In step S303, a length of the message bar in the instant messaging application is determined according to the audio duration.

Specifically, in the instant messaging application, a correspondence between audio duration corresponding to audio data and a length of a message bar is preset. Therefore, after audio duration corresponding to audio data is obtained, a length of a message bar matching the audio duration may be found from a stored data table of the instant messaging application.

In step S304, a voiceprint region length corresponding to the audio data is determined according to a reserved edge space corresponding to the message bar and the length of the message bar.

Specifically, the terminal device may obtain a reserved edge space corresponding to a message bar in the instant messaging application. The reserved edge space includes a left reserved edge space and a right reserved edge space of the message bar and may be determined according to a length of the message bar. For example, the left reserved edge space and the right reserved edge space are respectively 5% of the length of the message bar, or may be preset. For example, regardless of the length of the message bar, the left reserved edge space and the right reserved edge space are both set to 2 mm. A voiceprint region length corresponding to the audio data may be determined according to the length of the message bar and the reserved edge space, that is, the voiceprint region length corresponding to the audio data may be obtained by subtracting the reserved edge space from the length of the message bar.

In step S305, the quantity of the voiceprint points corresponding to the audio data is determined according to the voiceprint region length, a size of a voiceprint point pattern, and the distance between adjacent voiceprint points.

Specifically, a size of a voiceprint point pattern and a distance between adjacent voiceprint points are obtained, and the quantity of the voiceprint points corresponding to the audio data may be determined according to the voiceprint region length, the size of the voiceprint point pattern, and the distance between adjacent voiceprint points. If the voiceprint point pattern is a voiceprint point, the size of the voiceprint point pattern may be ignored, and the quantity of voiceprint points may be calculated by using an expression: [a voiceprint region length+a distance between two adjacent voiceprint points]/a distance between two adjacent voiceprint points. If the voiceprint point pattern is a voiceprint bar, that is, a voiceprint point is used as a midpoint of a side length on the voiceprint bar, a width of the voiceprint bar and a distance between two adjacent voiceprint bars are obtained, and a quantity of voiceprint bars may be calculated by using an expression: [a voiceprint region length+the distance between two adjacent voiceprint bars]/(the width of the voiceprint bar+the distance between two adjacent voiceprint bars). The width of the voiceprint bar and the distance between the voiceprint points are fixed.

When audio duration corresponding to audio data exceeds a duration threshold (for example, 40 s), a fixed value (for example, 25) may be determined as a quantity of voiceprint points corresponding to the audio data. When the audio duration corresponding to the audio data is less than or equal to the duration threshold (for example, 40 s), step S303 to step S305 are performed.

In step S306, unit audio duration corresponding to the each voiceprint point is determined according to the audio duration.

Specifically, after the quantity of voiceprint points is determined, unit audio duration corresponding to each voiceprint point may be determined according to the audio duration, and a sum of the unit audio duration corresponding to the each voiceprint point in the audio data is equal to the audio duration of the audio data. For example, duration corresponding to audio data is 10 s, a quantity of voiceprint points is 10, unit audio duration corresponding to each voiceprint point may be determined as 1 s, that is, a unit audio duration interval corresponding to the first voiceprint point is 0 s to is in the audio data, a unit audio duration interval corresponding to the second voiceprint point is 1 s to 2 s in the audio data, and so on, so that the unit audio duration interval corresponding to each voiceprint point in the audio data may be determined.

In step S307, an average volume value corresponding to sampled volume data in the unit audio duration is obtained, and a to-be-processed height corresponding to the each voiceprint point is determined based on the average volume value.

Figure 5:
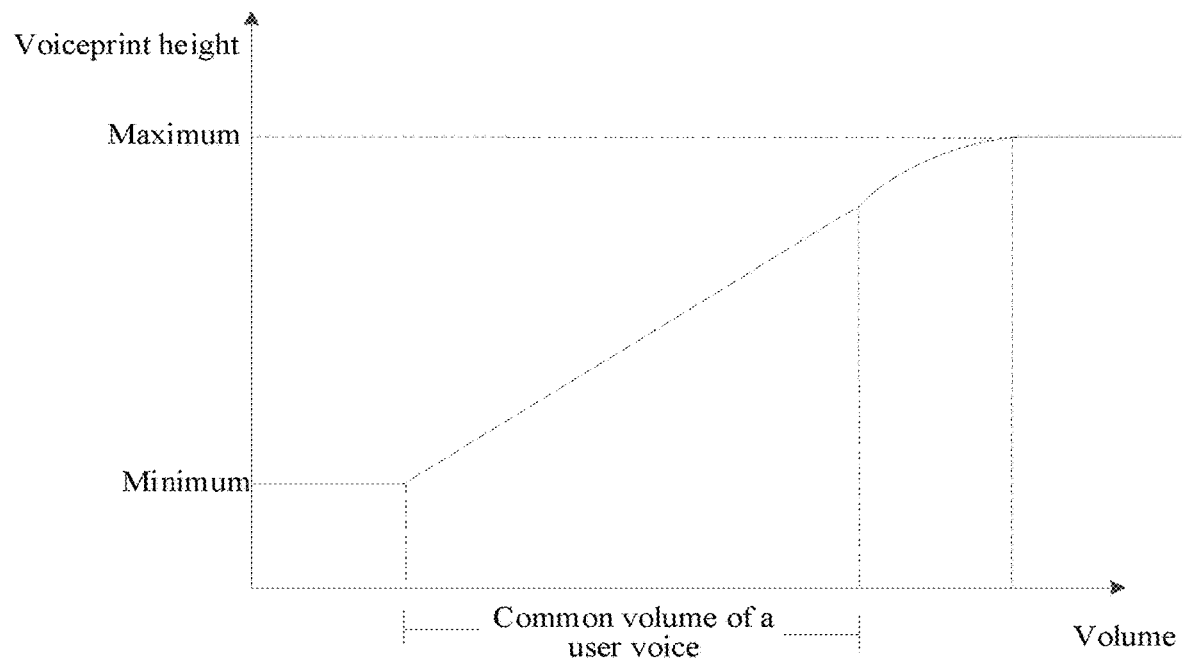
FIG. 5 is a schematic diagram of a voiceprint visualization calculation rule according to an exemplary embodiment of this disclosure.

Specifically, the average volume value corresponding to the sampled volume data in the unit audio duration may be obtained. For example, a sampling frequency is 100 times per second, a unit audio duration interval corresponding to a voiceprint point is 1 s to 2 s, and an average volume of 100 pieces of sound data sampled in the range of is to 2 s in sampled volume data is calculated. A to-be-processed height corresponding to each voiceprint point is determined according to a function relationship between a volume and a height of a voiceprint point, and a specific implementation process includes determining a target value as a to-be-processed height of a voiceprint point corresponding to the average volume value in a case that the average volume value is less than a first volume threshold, determining the to-be-processed height of the voiceprint point corresponding to the average volume value according to a linear growth function between a volume and a height in a case that the average volume value is greater than or equal to the first volume threshold and less than a second volume threshold, and determining the to-be-processed height of the voiceprint point corresponding to the average volume value according to a logarithmic growth function between a volume and a height in a case that the average volume value is greater than or equal to the second volume threshold. FIG. 5 is a schematic diagram of a voiceprint visualization calculation rule according to an embodiment of this application. As shown in FIG. 5, a change of a to-be-processed height of a voiceprint point relative to a volume is nonlinear, but may be expressed as a piecewise function. When an average volume value is less than a first volume threshold, that is, less than a normal volume of a user voice, a target value (a fixed value) may be determined as a to-be-processed height of a voiceprint point corresponding to the average volume value. In other words, a to-be-processed height of a voiceprint point corresponding to an average volume value that is less than the normal volume of the user voice is remains minimum. When the average volume value is greater than or equal to the first volume threshold and less than a second volume threshold, that is, in the normal volume range of the user voice, a change of the to-be-processed height of the voiceprint point relative to the volume is linear, and the to-be-processed height of the voiceprint point corresponding to the average volume value may be determined according to a linear growth function between a volume and a height. When the average volume value is greater than or equal to the second volume threshold, that is, greater than the normal volume of the user voice, a change of the to-be-processed height of the voiceprint point relative to the volume is nonlinear, and as the volume increases, the to-be-processed height reaches a maximum value. The to-be-processed height of the voiceprint point corresponding to the average volume value may be determined according to a logarithmic growth function between a volume and a height.

In step S308, interpolation parameter information corresponding to the to-be-processed height is obtained, and the height corresponding to each voiceprint point is determined based on the interpolation parameter information and the to-be-processed height.

Specifically, during actual application, a height difference between to-be-processed heights corresponding to voiceprint points calculated by using the above voiceprint visualization rule is small. Therefore, the difference between the to-be-processed heights may be enlarged by using a decelerate interpolator, that is, for two voiceprint points with different to-be-processed heights, interpolation parameter information corresponding to the two to-be-processed heights may be obtained by using the decelerate interpolator, the to-be-processed heights are multiplied by the respective interpolation parameter information, and a height difference between the two to-be-processed heights may be increased. For example, before being enlarged, a height difference between two to-be-processed heights is 0.01 cm, and after being enlarged, the height difference between the two to-be-processed heights may be changed to 0.05 cm.

In step S309, a to-be-processed spectrogram corresponding to the audio data is generated according to the quantity and the height.

Specifically, a to-be-processed spectrogram corresponding to audio data may be drawn according to a quantity of voiceprint points and a height corresponding to each voiceprint point. The to-be-processed spectrogram may include information such as the volume and pitch of sound in audio data.

In step S310, a sound parameter corresponding to the audio data is obtained, and a voiceprint shape type matching the sound parameter is selected from a spectrogram library.

Specifically, a sound parameter corresponding to the audio data may be obtained, a sound type corresponding to the audio data may be determined according to information about the sound parameter, and a voiceprint shape type matching the sound type is selected from a spectrogram library according to the sound type. In an instant messaging application, there may be a plurality of sound types, for example, a "normal" sound type, a "loli" sound type, an "uncle" sound type, a "horror" sound type, and a "funny" sound type, and different sound types have different sound parameters or may correspond to different voiceprint shape types. Certainly, one sound type may correspond to one voiceprint shape type. For example, a voiceprint shape type corresponding to the "normal" sound type is a bar voiceprint type, and a voiceprint shape type corresponding to the "loli" sound type is a curved voiceprint type. Alternatively, a plurality of sound types may correspond to one voiceprint shape type. For example, voiceprint shape types corresponding to the "normal" sound type and the "uncle" sound type are both bar voiceprint types, and voiceprint shape types corresponding to the "loli" sound type, the "horror" sound type, and the "funny" sound type are curved voiceprint type. This is not limited thereto. A correspondence between a sound type and a voiceprint shape type is stored in the spectrogram library, and the voiceprint shape type may be directly found in the spectrogram library according to the sound type.

In step S311, the spectrogram corresponding to the audio data is determined according to the voiceprint shape type and the to-be-processed spectrogram, and a message bar including the spectrogram and the audio data is outputted.

Figure 6A:
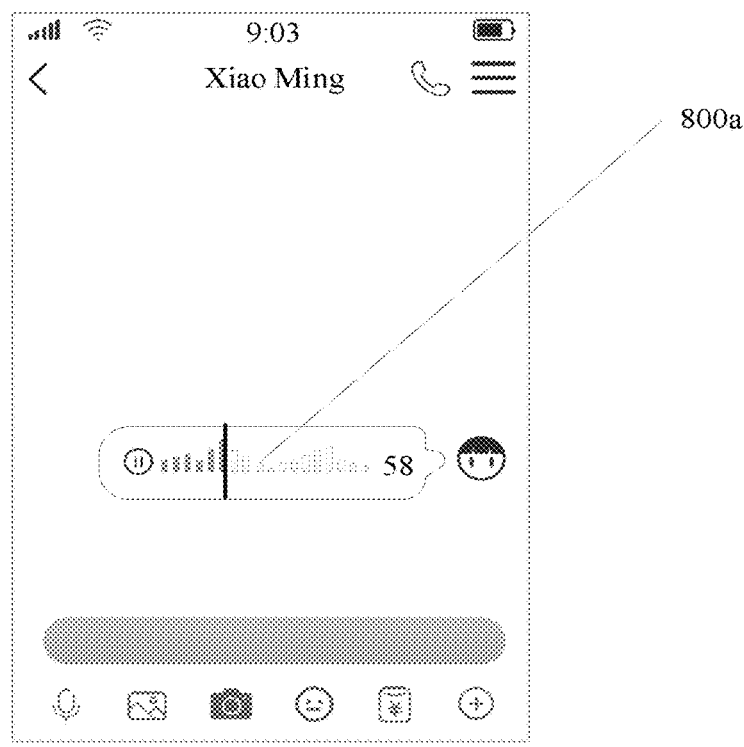
FIG. 6a is a schematic diagram of an interface of a visualized voiceprint shape type according to an exemplary embodiment of this disclosure.
Figure 6B:
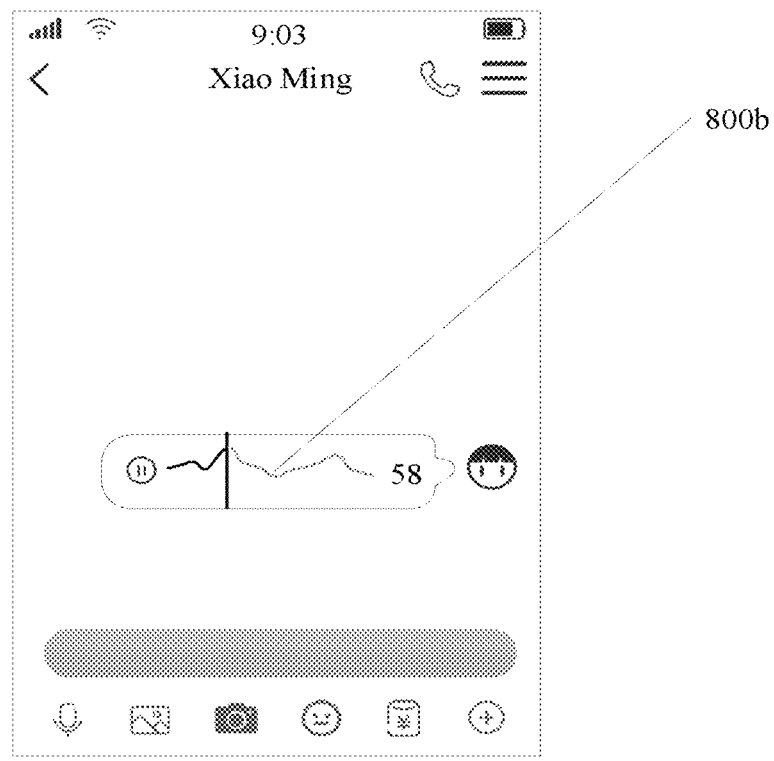
FIG. 6b is another schematic diagram of an interface of a visualized voiceprint shape type according to an exemplary embodiment of this disclosure.
Figure 6C:
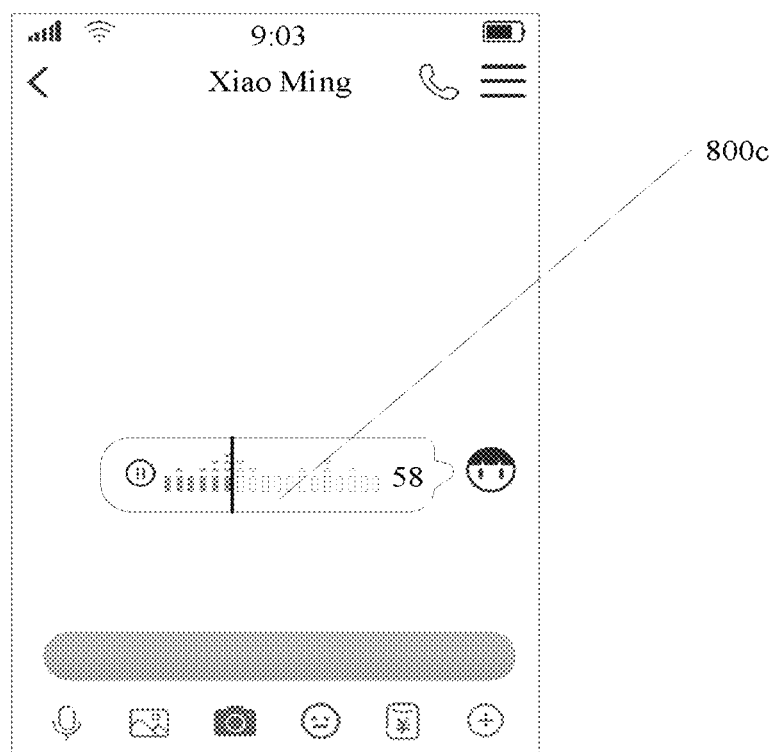
FIG. 6c is a further schematic diagram of an interface of a visualized voiceprint shape type according to an exemplary embodiment of this disclosure.

Specifically, FIG. 6a to FIG. 6c are schematic diagrams of an interface of a visualized voiceprint shape type according to an embodiment of this application. A final spectrogram, for example, a visualized spectrogram 800a in FIG. 6a, a visualized spectrogram 800b in FIG. 6b, or a visualized spectrogram 800c in FIG. 6c, may be generated according to the voiceprint shape type and the to-be-processed spectrogram, and a message bar including the spectrogram and the audio data is outputted in the chat window of the instant messaging application. For the visualized spectrogram 800a, or referred to as a bar spectrogram, in FIG. 6a, a width of each voiceprint bar and a spacing between voiceprint bars are preset fixed values, a height of each voiceprint bar may be determined according to a height of each voiceprint point, and a quantity of voiceprint points is a quantity of voiceprint bars. Therefore, the visualized spectrogram 800a may be generated according to the height of each voiceprint bar and the quantity of voiceprint bars. For the visualized spectrogram 800b, or referred to as a curved spectrogram, in FIG. 6b, voiceprint points may be connected by a curve according to the quantity of the voiceprint points and the height of the voiceprint points to form a smooth spectrogram curve, that is, the visualized spectrogram 800b. For the visualized spectrogram 800c in FIG. 6c, a minimum value is selected from heights corresponding to all voiceprint points, an initial rectangular box of each voiceprint bar is determined according to the minimum value, a quantity of out-of-rectangular boxes of each voiceprint bar is determined according to a part, with a height exceeding the minimum value (a width and a height of the out-of-rectangular box are preset fixed values), of the voiceprint point, and a voiceprint bar corresponding to each voiceprint point may be formed by the initial rectangular box and the out-of-rectangular box (the height of the initial rectangular box and the out-of-rectangular box is the same as the height of the voiceprint point), to determine the visualized spectrogram 800c.

In step S312, audio progress control is performed on the audio data in response to a target trigger operation on the message bar, and display control is performed on the spectrogram based on an audio progress.

For a specific implementation of step S312, reference may be made to the description about step S201 to step S207 in the foregoing exemplary embodiments corresponding to FIG. 3a to FIG. 3c. Details are not described herein again.

Figure 7:
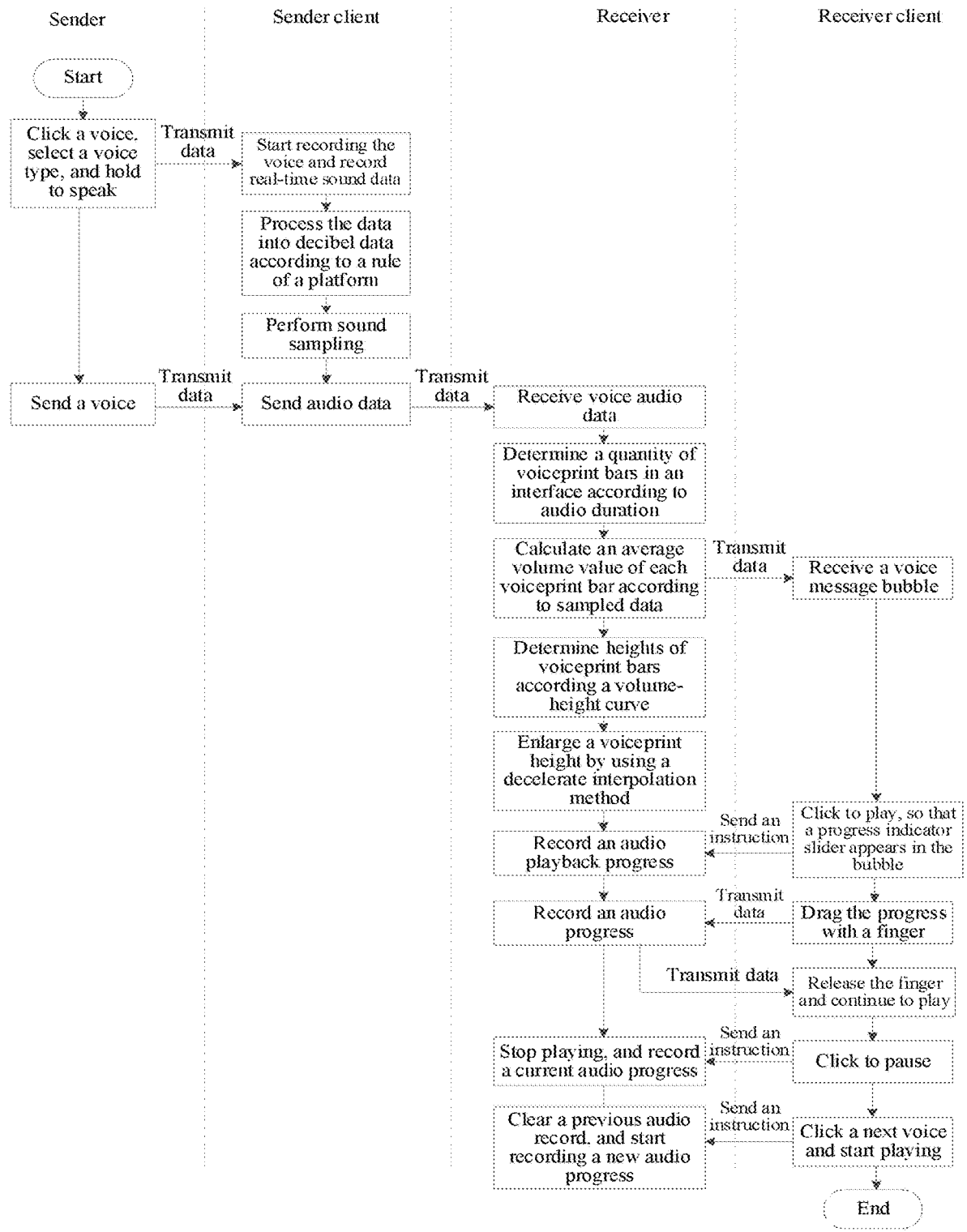
FIG. 7 is a model diagram of implementing a voice message technology based on an instant messaging application according to an exemplary embodiment of this disclosure.

FIG. 7 is a model diagram of implementing a voice message technology based on an instant messaging application according to an exemplary embodiment of this disclosure. As shown in FIG. 7, when a user is in a chat scenario of an instant messaging application, a sender may click a voice after opening a chat interface of the instant messaging application, select a voice type, and press and hold a voice icon in a voice operation panel to speak. The speaking process of the sender is a process of transmitting data to an instant messaging application client corresponding to the sender (which is briefly referred to as a sender client below). Therefore, when the sender speaks, the sender client may start recording a voice, record real-time sound data of the sender, convert the recorded real-time sound data into decibel data within an interval of [0, 255] according to a rule in the instant messaging application, and perform sound sampling on the recorded real-time sound data. When the sender releases the finger, the sender client completes the real-time recording process and sampling process of the sound data. Therefore, voice audio data (including the recorded real-time sound data and the sampled data) may be sent to an instant messaging application client corresponding to a receiver (which is briefly referred to as a receiver client below). After receiving the voice audio data sent by the sender client, the receiver client may determine a quantity of voiceprint bars in the chat interface according to audio duration (a voiceprint display type of a spectrogram is a bar display type by default), calculate an average volume value of each voiceprint bar according to the sampled data, and determine a height of each voiceprint bar according to a volume-height curve. Because the height calculated in this way is relatively small, the height of the voiceprint bar may be enlarged by using a decelerate interpolation method to generate a spectrogram corresponding to the voice audio data. After calculating the average volume value of each voiceprint bar according to the sampled data, the receiver client may transmit the voice audio data to the receiver and display a voice message bubble (that is, a voice message bar) in a chat interface of the receiver. The spectrogram corresponding to the voice audio data may be further displayed in the voice message bubble. When the receiver clicks to play the voice audio data included in the voice message bubble, a progress indicator slider may be displayed in the voice message bubble. In this case, the receiver client may record an audio playback progress. If the receiver presses and holds the progress indicator slider and drags the progress indicator slider, the playing of voice audio data stops, and the receiver client may record a progress of the voice audio data. After the receiver releases the finger, a jump may be made to a progress in the voice audio data when the dragging stops to continue to play. If the receiver clicks to pause, the receiver client may stop playing the voice audio data and record a current audio progress. When the receiver clicks to play a next voice message, the receiver client may clear an audio record of a previous voice message and start recording an audio progress of the new voice message. Thus, the implementation process of the voice message technology is completed.

It can be seen that in a chat scenario in an instant messaging application, a spectrogram corresponding to audio data is displayed in a message bar, and a user may click the message bar to play/pause a voice, determine a sound region by using the visualized spectrogram, adjust a voice progress by sliding, and watch a text translation corresponding to the voice in real time when the progress is adjusted, to increase the diversity of display forms of the audio data and enrich operation manners of the audio data. In addition, the user can efficiently listen to, watch, and operate a voice message, so that the interactivity, readability, and efficiency of the voice message are greatly enhanced, and the convenient use of the voice message by the user in the instant messaging application is better promoted.

Figure 8:
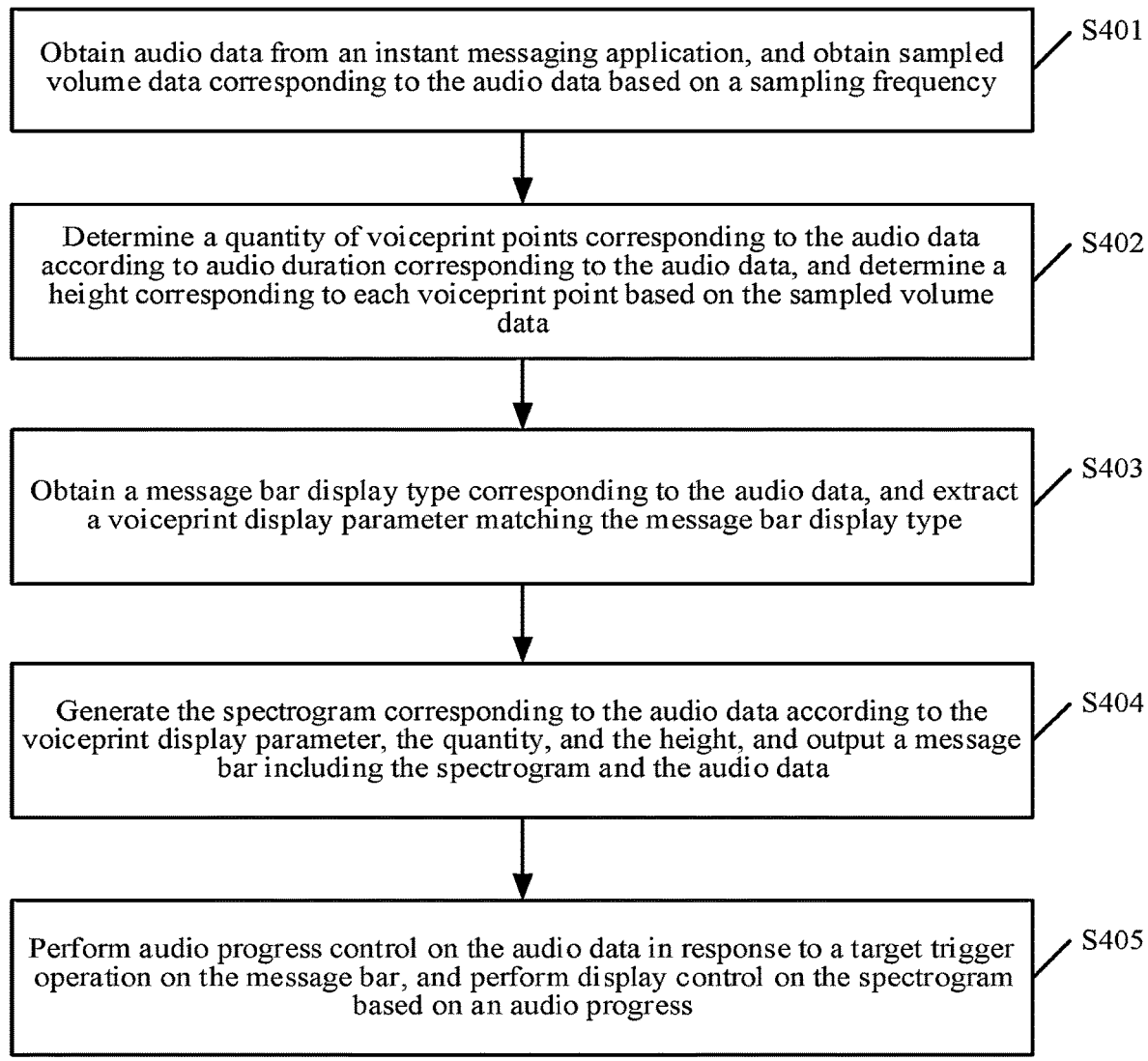
FIG. 8 is a schematic flowchart of another data processing method based on an instant messaging application according to an exemplary embodiment of this disclosure.

FIG. 8 is a schematic flowchart of another data processing method based on an instant messaging application according to an exemplary embodiment of this disclosure. As shown in FIG. 8, the method may be performed by a data processing device based on an instant messaging application shown in FIG. 12 and includes the following steps.

In step S401, audio data is obtained from an instant messaging application, and sampled volume data corresponding to the audio data is obtained based on a sampling frequency.

In step S402, a quantity of voiceprint points corresponding to the audio data is determined according to audio duration corresponding to the audio data, and a height corresponding to each voiceprint point is determined based on the sampled volume data.

For a specific implementation process of step S401 and step S402, reference may be made to steps S101 and S102 in the foregoing exemplary embodiment corresponding to FIG. 2, or reference may be made to step S301 to step S308 in the foregoing exemplary embodiment corresponding to FIG. 4. Details are not described herein again.

In step S403, a message bar display type corresponding to the audio data is obtained, and a voiceprint display parameter matching the message bar display type is extracted.

Specifically, after a quantity of voiceprint points and a height of each voiceprint point are determined, the terminal device may obtain a message bar display type corresponding to the audio data and extract a voiceprint display parameter matching the message bar display type from a local storage. In other words, the user may select any message bar display type from a plurality of message bar display types provided in the instant messaging application. When a background color of a message bar in the message bar display type conflicts with a display color of a spectrogram (that is, the colors are the same or close, and the spectrogram in the message bar cannot be distinguished), a voiceprint display parameter matching the message bar display type may be extracted from the local storage, that is, a color that is significantly different from the background color in the message bar display type is extracted as a voiceprint display color of the spectrogram, or referred to as a voiceprint display parameter.

Figure 9:
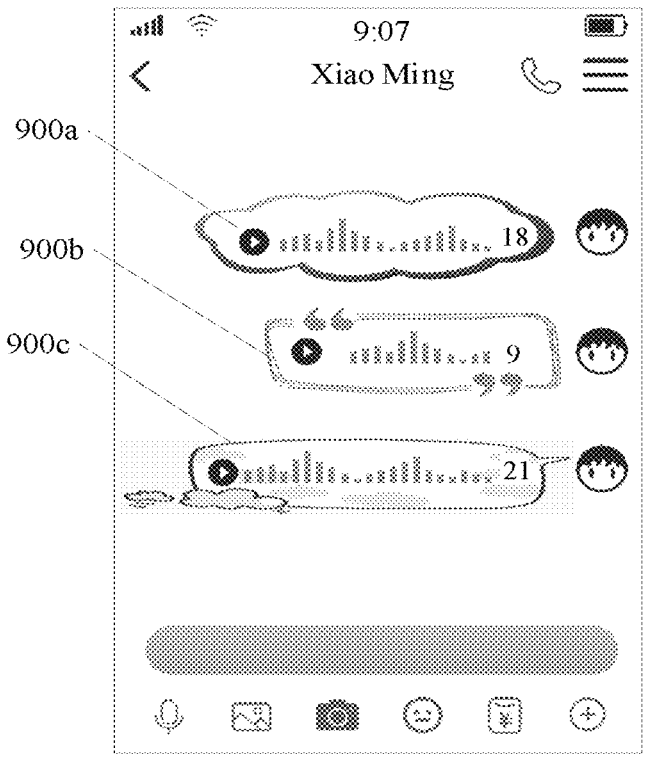
FIG. 9 is a schematic diagram of an interface of a personalized message bar display type according to an exemplary embodiment of this disclosure.

The instant messaging application may provide a plurality of message bar display types to the user. FIG. 9 is a schematic diagram of an interface of a personalized message bar display type according to an exemplary embodiment of this disclosure. As shown in FIG. 9, the message bar display type may include a message bar display type 900a, a message bar display type 900b, and a message bar display type 900c. In the instant messaging application, a message bar display type corresponding to audio data may be adaptively matched according to a sound type (for example, a voice change type) of the audio data, or a satisfactory message bar display type may be selected from a client as required, and the client may obtain the message bar display type and extract a voiceprint display parameter matching the message bar display type. For example, if a message bar display type selected by the user for audio data is the message bar display type 900a, a voiceprint display parameter matching the message bar display type 900a is determined according to background color information of the message bar display type 900a. If the background color information of the message bar display type 900a is black, the voiceprint display parameter may be determined as white.

A correspondence between the message bar display type and the voiceprint display parameter may be stored in a local file of the instant messaging application. When the terminal device obtains a voiceprint display parameter corresponding to a spectrogram, a message bar display type corresponding to a message bar may be found in the local file according to the voiceprint display parameter.

In step S404, the spectrogram corresponding to the audio data is generated according to the voiceprint display parameter, the quantity, and the height, and output the message bar including the spectrogram and the audio data.

Specifically, the terminal device may draw a to-be-processed spectrogram according to a quantity of voiceprint points and a height corresponding to each voiceprint point, determine a final spectrogram corresponding to audio data according to a voiceprint display parameter, and output a message bar including the spectrogram and the audio data in a chat interface of the instant messaging application. In this case, the spectrogram may be clearly distinguished from a background color in the message bar.

In step S405, audio progress control is performed on the audio data in response to a target trigger operation on the message bar, and display control is performed on the spectrogram based on an audio progress.

For a specific implementation of step S405, reference may be made to the description about step S201 to step S207 in the foregoing exemplary embodiments corresponding to FIG. 3a to FIG. 3c. Details are not described herein again.

Figure 10:
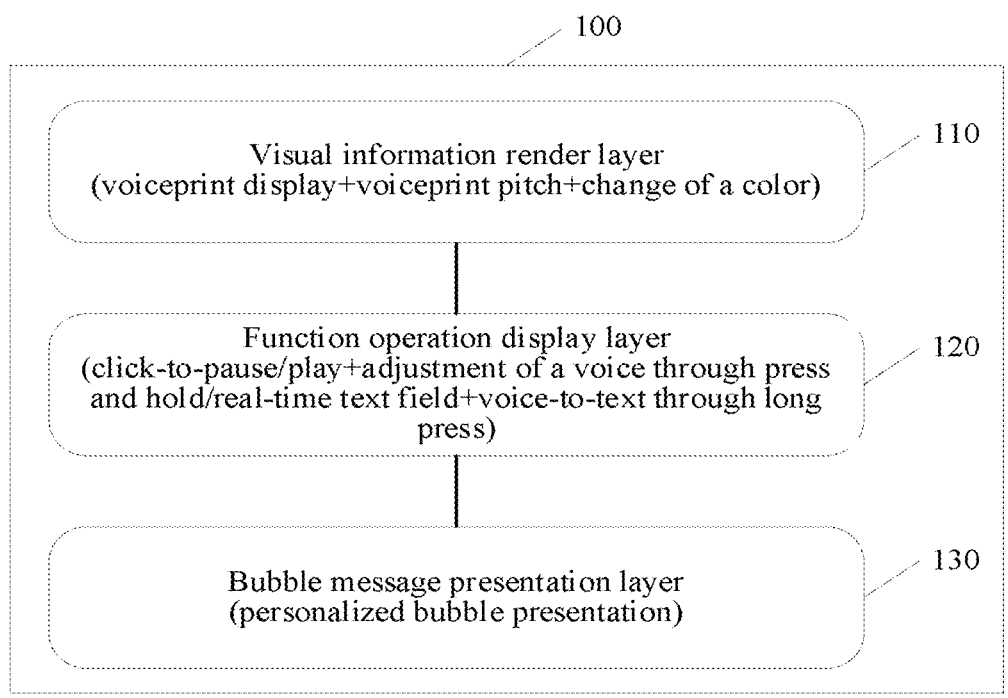
FIG. 10 is a schematic structural diagram of a message bar functional model according to an exemplary embodiment of this disclosure.

FIG. 10 is a schematic structural diagram of a message bar functional model according to an exemplary embodiment of this disclosure. As shown in FIG. 10, the message bar functional model 100 may recognize voice information in current voice audio data according to an environmental factor of a user and a speaking manner of a voice of each user, analyze data change of voice information, and convert the voice information into a pattern for visualized message display. The message bar functional model may be mainly implemented by a visual information render layer 110, a function operation display 120, and a bubble message presentation 130. The visual information render layer 110 may draw visualized voiceprint information and determine a location of a voiceprint element, a voiceprint pitch, and a change of a voiceprint color during drawing. The function operation display 120 may provide a user with functions such as operable click-to-pause/play, adjustment of a voice through press and hold, real-time text field, and voice-to-text through long press. The bubble message presentation 130 may provide a personalized message bar display type for voice audio data, that is, provide a changeable message bar visual background for the voice audio data.

It can be seen that in a chat scenario in an instant messaging application, a spectrogram corresponding to audio data is displayed in a message bar, and a user may click the message bar to play/pause a voice, determine a sound region by using the visualized spectrogram, adjust a voice progress by sliding, and watch a text translation corresponding to the voice in real time when the progress is adjusted, to increase the diversity of display forms of the audio data and enrich operation manners of the audio data. In addition, the user can efficiently listen to, watch, and operate a voice message, so that the interactivity, readability, and efficiency of the voice message are greatly enhanced, and the convenient use of the voice message by the user in the instant messaging application is better promoted.

Figure 11:
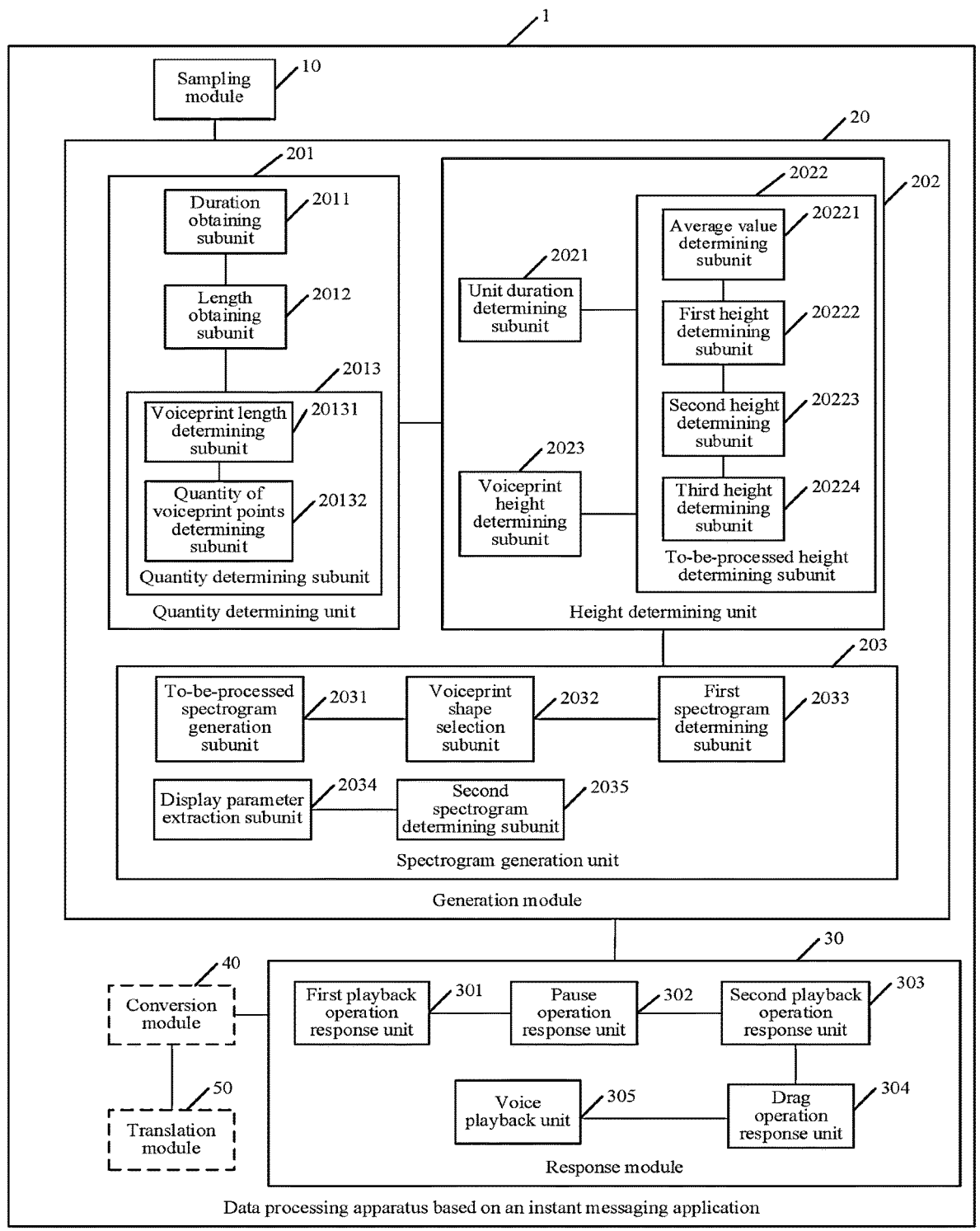
FIG. 11 is a schematic structural diagram of a data processing apparatus based on an instant messaging application according to an exemplary embodiment of this disclosure.

FIG. 11 is a schematic structural diagram of a data processing apparatus based on an instant messaging application according to an exemplary embodiment of this disclosure. As shown in FIG. 11, the data processing apparatus 1 based on an instant messaging application may include a sampling module 10, a generation module 20, and a response module 30. As can be appreciated, the sampling module 10, the generation module 20, and the response module 30 may be implemented by processing circuitry in order to perform their respective functions.

The sampling module 10 is configured to obtain audio data from an instant messaging application, and obtain sampled volume data corresponding to the audio data based on a sampling frequency.

Specifically, when a user clicks a voice icon in a chat window of the instant messaging application to enter a voice operation panel, selects a required voice mode, and presses and holds the voice icon to speak, the sampling module 10 may record sound data of the user in real time, and use the recorded sound data of the user as audio data. When the user selects a voice change mode, the audio data is sound data obtained after the user changes the sound. A digital expression manner of audio data varies in different operating systems. Therefore, the sampling module 10 needs to uniformly convert acquired audio data into decibel data ranging from 0 to 255. For example, in an operating system of a terminal, an interval corresponding to sound data acquired by the sampling module 10 is [0, 1]. Therefore, the sampling module 10 needs to convert the acquired sound data into decibel data within an interval of [0, 255]. After the audio data is converted, a sampling frequency corresponding to the audio data is determined, and sound sampling is performed on the audio data based on the sampling frequency, to obtain sampled volume data, that is, after the audio data is converted into decibel data, sound sampling is performed. For obtained audio data, sound sampling may be first performed on the audio data based on a sampling frequency, and after sampled volume data is obtained, the sampled volume data is converted into decibel data ranging from 0 to 255, that is, after sound sampling is performed on the audio data, the sampled volume data is converted into the decibel data. For example, when the sampling frequency is 100 times per second, it means that 100 sound data points may be sampled per second from audio data.

The generation module 20 is configured to generate a spectrogram corresponding to the audio data according to the audio data and the sampled volume data, and output a message bar including the spectrogram and the audio data.

Specifically, the generation module 20 may obtain audio duration corresponding to the audio data, determine a quantity of voiceprint points corresponding to the audio data according to the audio duration, to determine audio duration corresponding to each voiceprint point in the audio data, and determine a height corresponding to the each voiceprint point according to sampled volume data in the audio duration corresponding to the each voiceprint point. In other words, the height of the voiceprint point is related to the volume of sound in the sampled volume data. Within a preset volume range (for example, a common volume range of a user voice), when the volume of sound is higher, the height corresponding to the voiceprint point is larger. To ensure the readability and visual beauty of a message bar, when the volume of sound in the sampled volume data is less than the preset volume range (for example, 60 decibels to 150 decibels), the height corresponding to the voiceprint point is minimum. When the volume of sound in the sampled volume data is greater than the preset volume range, the height corresponding to the voiceprint point is maximum. The terminal device may generate a spectrogram corresponding to the audio data according to the determined quantity of voiceprint points and the height corresponding to each voiceprint point, and output a message bar including the spectrogram and the audio data in a chat window of the instant messaging application. The spectrogram is to perform visualized information display on the audio data by using a pattern, that is, a location of a voiceprint element and pitches in the audio data are expressed by using the spectrogram (in the spectrogram, a height of a voiceprint point may be represented as the volume of sound in the audio data, and a change trend of the height of the voiceprint point may be represented as a change trend of the volume of sound in the audio data). Therefore, the volume of sound and a sound change of the audio data can be perceived according to the spectrogram, and the user can quickly determine an operation manner (for example, an earpiece mode, a hands free mode, and a silent state) of a message bar including the audio data. If a height corresponding to a voiceprint point is relatively low in a spectrogram, the message bar may be operated in the hands free mode. If the height corresponding to the voiceprint point is relatively high in the spectrogram, the message bar may be operated in the silent state or the earpiece mode.

The response module 30 is configured to perform audio progress control on the audio data in response to a target trigger operation on the message bar, and perform display control on the spectrogram based on an audio progress.

Specifically, the response module 30 may perform audio progress control on the audio data in response to a target trigger operation of a user on the message bar, and perform display control on the spectrogram based on an audio progress, that is, may record progress information of the audio data in real time, and display, in the message bar including the audio data, a progress of read audio data and a progress of unread audio data in the audio data according to the progress information. The target trigger operation may include a playback trigger operation, a pause trigger operation, and a drag trigger operation, or may include a voice-to-text trigger operation, a translation trigger operation, or the like.

Referring to FIG. 11, the data processing apparatus 1 based on an instant messaging application may further include a conversion module 40 and a translation module 50, which may also be implemented by processing circuitry.

The conversion module 40 is configured to convert the audio data into first text data in response to a text conversion trigger operation on the message bar, and display the first text data in a second text display region corresponding to the spectrogram.

The translation module 50 is configured to perform text type conversion processing on the first text data in response to a translation trigger operation on the first text data, to obtain second text data, and display the second text data in the second text display region.

For specific functional implementations of the conversion module 40 and the translation module 50, reference may be made to step S206 and step S207 in the foregoing exemplary embodiment corresponding to FIG. 3c. Details are not described herein again.

Referring to FIG. 11, the generation module 20 may include a quantity determining unit 201, a height determining unit 202, and a spectrogram generation unit 203.

The quantity determining unit 201 is configured to determine a quantity of voiceprint points corresponding to the audio data according to audio duration corresponding to the audio data.

The height determining unit 202 is configured to determine a height corresponding to each voiceprint point based on the sampled volume data.

The spectrogram generation unit 203 is configured to generate the spectrogram corresponding to the audio data according to the quantity and the height.

For specific functional implementations of the quantity determining unit 201 and the height determining unit 202, reference may be made to step S302 to step S308 in the foregoing exemplary embodiment corresponding to FIG. 4, and for a specific functional implementation of the spectrogram generation unit 203, reference may be made to step S309 to step S311 in the foregoing exemplary embodiment corresponding to FIG. 4 and step S403 and step S404 in the foregoing exemplary embodiment corresponding to FIG. 8. Details are not described herein again.

Referring to FIG. 11, the response module 30 may include a first playback operation response unit 301, a pause operation response unit 302, a second playback operation response unit 303, a drag operation response unit 304, and a voice playback unit 305.

The first playback operation response unit 301 is configured to perform voice playback on the audio data in response to the first playback trigger operation on the message bar, record an audio playback progress of the audio data, and display the progress indicator slider in the spectrogram according to the audio playback progress.

The pause operation response unit 302 is configured to stop performing voice playback on the audio data in response to the pause trigger operation on the message bar, and record a stop timestamp of a location of the progress indicator slider during stopping.

The second playback operation response unit 303 is configured to start playing a voice from a location of a stop timestamp in the audio data in response to the second playback trigger operation on the message bar.

The drag operation response unit 304 is configured to obtain a first timestamp of the dragged progress indicator slider in the audio data in response to the drag trigger operation on the progress indicator slider in the message bar, display text information of audio data corresponding to the first timestamp in a first text display region corresponding to the spectrogram, and perform region update on the played voiceprint region and the unplayed voiceprint region according to the dragged progress indicator slider.

The voice playback unit 305 is configured to obtain a second timestamp of the progress indicator slider in the audio data in a case that dragging ends, and start playing a voice from a location of the second timestamp in the audio data.

For specific functional implementations of the first playback operation response unit 301, the pause operation response unit 302, the second playback operation response unit 303, the drag operation response unit 304, and the voice playback unit 305, reference may be made to step S201 to step S205 in the foregoing exemplary embodiments corresponding to FIG. 3a to FIG. 3c. Details are not described herein again.

Referring to FIG. 11, the quantity determining unit 201 may include duration obtaining subunit 2011, a length obtaining subunit 2012, and a quantity determining subunit 2013.

The duration obtaining subunit 2011 is configured to obtain audio duration corresponding to the audio data.

The length obtaining subunit 2012 is configured to determine a length of the message bar in the instant messaging application according to the audio duration.

The quantity determining subunit 2013 is configured to determine the quantity of the voiceprint points corresponding to the audio data according to the length of the message bar and a distance between adjacent voiceprint points.

For specific functional implementations of the duration obtaining subunit 2011, the length obtaining subunit 2012, and the quantity determining subunit 2013, reference may be made to step S302 to step S305 in the foregoing exemplary embodiment corresponding to FIG. 4. Details are not described herein again.

Referring to FIG. 11, the height determining unit 202 may include a unit duration determining subunit 2021, a to-be-processed height determining subunit 2022, and a voiceprint height determining subunit 2023.

The unit duration determining subunit 2021 is configured to determine unit audio duration corresponding to the each voiceprint point according to the audio duration.

The to-be-processed height determining subunit 2022 is configured to obtain an average volume value corresponding to sampled volume data in the unit audio duration, and determine a to-be-processed height corresponding to the each voiceprint point based on the average volume value.

The voiceprint height determining subunit 2023 is configured to obtain interpolation parameter information corresponding to the to-be-processed height, and determine the height corresponding to the each voiceprint point based on the interpolation parameter information and the to-be-processed height.

For specific functional implementations of the unit duration determining subunit 2021, the to-be-processed height determining subunit 2022, and the voiceprint height determining subunit 2023, reference may be made to step S306 to step S308 in the foregoing exemplary embodiment corresponding to FIG. 4. Details are not described herein again.

Referring to FIG. 11, the spectrogram generation unit 203 may include a to-be-processed spectrogram generation subunit 2031, a voiceprint shape selection subunit 2032, a first spectrogram determining subunit 2033, a display parameter extraction subunit 2034, and a second spectrogram determining subunit 2035.

The to-be-processed spectrogram generation subunit 2031 is configured to generate a to-be-processed spectrogram corresponding to the audio data according to the quantity and the height.

The voiceprint shape selection subunit 2032 is configured to obtain a sound parameter corresponding to the audio data, and select a voiceprint shape type matching the sound parameter from a spectrogram library.

The first spectrogram determining subunit 2033 is configured to generate the spectrogram corresponding to the audio data according to the voiceprint shape type and the to-be-processed spectrogram.

The display parameter extraction subunit 2034 is configured to obtain a message bar display type corresponding to the audio data, and extract a voiceprint display parameter matching the message bar di splay type.

The second spectrogram determining subunit 2035 is configured to generate the spectrogram corresponding to the audio data according to the voiceprint display parameter, the quantity, and the height.

The spectrogram generation unit 203 may include the to-be-processed spectrogram generation subunit 2031, the voiceprint shape selection subunit 2032, and the first spectrogram determining subunit 2033, and for specific functional implementations thereof, reference may be made to step S309 to step S311 in the foregoing exemplary embodiment corresponding to FIG. 4. The spectrogram generation unit 203 may further include the display parameter extraction subunit 2034 and the second spectrogram determining subunit 2035, and for specific functional implementations thereof, reference may be made to step S403 and step S404 in the foregoing exemplary embodiment corresponding to FIG. 8. Details are not described herein again.

Referring to FIG. 11, the quantity determining subunit 2013 may include a voiceprint length determining subunit 20131 and a quantity of voiceprint points determining unit 20132.

The voiceprint length determining subunit 20131 is configured to determine a voiceprint region length corresponding to the audio data according to a reserved edge space corresponding to the message bar and the length of the message bar.

The quantity of voiceprint points determining unit 20132 is configured to determine the quantity of the voiceprint points corresponding to the audio data according to the voiceprint region length, a size of a voiceprint point pattern, and the distance between adjacent voiceprint points.

For specific functional implementations of the voiceprint length determining subunit 20131 and the quantity of voiceprint points determining unit 20132, reference may be made to step S304 and step S305 in the foregoing exemplary embodiment corresponding to FIG. 4. Details are not described herein again.

Referring to FIG. 11, the to-be-processed height determining subunit 2022 may include an average value determining subunit 20221, a first height determining subunit 20222, a second height determining subunit 20223, and a third height determining subunit 20224.

The average value determining subunit 20221 is configured to obtain the average volume value corresponding to target sampled data within the unit audio duration.

The first height determining subunit 20222 is configured to determine a target value as a to-be-processed height of a voiceprint point corresponding to the average volume value in a case that the average volume value is less than a first volume threshold.

The second height determining subunit 20223 is configured to determine the to-be-processed height of the voiceprint point corresponding to the average volume value according to a linear growth function between a volume and a height in a case that the average volume value is greater than or equal to the first volume threshold and less than a second volume threshold.

The third height determining subunit 20224 is configured to determine the to-be-processed height of the voiceprint point corresponding to the average volume value according to a logarithmic growth function between a volume and a height in a case that the average volume value is greater than or equal to the second volume threshold.

For specific functional implementations of the average value determining subunit 20221, the first height determining subunit 20222, the second height determining subunit 20223, and the third height determining subunit 20224, reference may be made to step S307 in the foregoing exemplary embodiment corresponding to FIG. 4. Details are not described herein again.

It can be seen that in a chat scenario in an instant messaging application, a spectrogram corresponding to audio data is displayed in a message bar, and a user may click the message bar to play/pause a voice, determine a sound region by using the visualized spectrogram, adjust a voice progress by sliding, and watch a text translation corresponding to the voice in real time when the progress is adjusted, to increase the diversity of display forms of the audio data and enrich operation manners of the audio data. In addition, the user can efficiently listen to, watch, and operate a voice message, so that the interactivity, readability, and efficiency of the voice message are greatly enhanced, and the convenient use of the voice message by the user in the instant messaging application is better promoted.

FIG. 12 is a schematic structural diagram of a data processing device based on an instant messaging application according to an exemplary embodiment of this disclosure. As shown in FIG. 12, the data processing device 1000 based on an instant messaging application may include a processor 1001 (processing circuitry), a network interface 1004 (a network interface circuit), and a memory 1005 (memory circuits). In addition, the data processing device 1000 based on an instant messaging application may further include a user interface 1003 (user interface circuitry) and at least one communication bus 1002 (communication bus circuitry). The communication bus 1002 is configured to implement connection and communication between these components. The user interface 1003 may include a display and a keyboard. The user interface 1003 may further include a standard wired interface or wireless interface. The network interface 1004 may include a standard wired interface or wireless interface (for example, a Wi-Fi interface). The memory 1004 may be a high-speed RANI, or may be a non-volatile memory, for example, at least one magnetic disk memory. The memory 1005 may alternatively be at least one storage apparatus located away from the processor 1001. As shown in FIG. 12, the memory 1005 used as a non-transitory computer-readable storage medium may include an operating system, a network communication module, a user interface module, and a device-control application program.

In the data processing device 1000 based on an instant messaging application shown in FIG. 12, the network interface 1004 may provide a network communication function.

The user interface 1003 is mainly configured to provide an input for a user. The processor 1001 may be configured to call the device-control application program stored in the memory 1005, to implement the descriptions of the data processing method based on an instant messaging application in any one of the exemplary embodiments corresponding to FIG. 2, FIG. 4, and FIG. 8. Details are not described herein again.

It is to be understood that the data processing device 1000 based on an instant messaging application described in an exemplary embodiment of this disclosure can implement the descriptions of the data processing method based on an instant messaging application in any one of the exemplary embodiments corresponding to FIG. 2, FIG. 4, and FIG. 8, and can also implement the descriptions of the data processing apparatus 1 based on an instant messaging application in the exemplary embodiment corresponding to FIG. 11. Details are not described herein again. In addition, the description of beneficial effects of using the same method are not described herein again.

In addition, an exemplary embodiment of this application further provides a non-transitory computer-readable storage medium. The non-transitory computer-readable storage medium stores a computer program executed by the data processing apparatus 1 based on an instant messaging application mentioned above, and the computer program includes program instructions. When executing the program instructions, the processor can implement the descriptions of the data processing method based on an instant messaging application in any one of the exemplary embodiments corresponding to FIG. 2, FIG. 4, and FIG. 8. Therefore, details are not described herein again. In addition, the description of beneficial effects of using the same method are not described herein again. For technical details that are not disclosed in the embodiments of the non-transitory computer-readable storage medium of this disclosure, refer to the exemplary method embodiments.

A person of ordinary skill in the art will recognize that all or some of the procedures of the methods of the foregoing exemplary embodiments may be implemented by a computer program instructing relevant hardware. The program may be stored in a non-transitory computer-readable storage medium. When the program is executed, the procedures of the foregoing exemplary method embodiments may be implemented. The foregoing storage medium may include a magnetic disc, an optical disc, a ROM, a RAM, or the like.

What is disclosed above is merely exemplary embodiments of this disclosure, and is not intended to limit the scope of the claims of this disclosure. Therefore, equivalent variations made in accordance with the claims of this disclosure shall fall within the scope of this disclosure.

What is claimed is:

1. A data processing method based on an instant messaging application, the method comprising:
    obtaining, by processing circuitry of a data processing device, audio data from an instant messaging application, and obtaining sampled volume data corresponding to the audio data based on a sampling frequency;
    generating, by the processing circuitry of the data processing device, a spectrogram corresponding to the audio data according to the audio data and the sampled volume data, and outputting a message bar comprising the spectrogram and the audio data, the spectrogram comprising plural voiceprint points, each having a corresponding height determined by
        obtaining an average volume value of sampled volume data corresponding to the respective voiceprint point;
        in response to a determination that the average volume value is greater than or equal to a first volume threshold and less than a second volume threshold, determining the height of the respective voiceprint point according to a linear growth function between volume and height; and
        in response to a determination that the average volume value is greater than or equal to the second volume threshold, determining the height of the respective voiceprint
    point according to a logarithmic growth function between volume and height; and
    performing audio progress control on the audio data in response to a target trigger operation on the message bar, and performing display control on the spectrogram based on an audio progress.

2. The method according to claim 1, wherein the generating comprises:
    determining a quantity of the plural voiceprint points corresponding to the audio data according to audio duration corresponding to the audio data.

3. The method according to claim 2, wherein the determining the quantity of the plural voiceprint points comprises:
    determining a length of the message bar in the instant messaging application according to the audio duration; and
    determining the quantity of the plural voiceprint points corresponding to the audio data according to the length of the message bar and a distance between adjacent voiceprint points.

4. The method according to claim 3, wherein the determining the quantity of the plural voiceprint points corresponding to the audio data according to the length of the message bar and the distance between adjacent voiceprint points comprises:
    determining a voiceprint region length corresponding to the audio data according to a reserved edge space corresponding to the message bar and the length of the message bar; and
    determining the quantity of the plural voiceprint points corresponding to the audio data according to the voiceprint region length, a size of a voiceprint point pattern, and the distance between adjacent voiceprint points.

5. The method according to claim 2, further comprising:
    determining unit audio duration corresponding to each voiceprint point according to the audio duration, wherein the obtaining the average volume value comprises obtaining an average volume value of sampled volume data in the unit audio duration; and
    obtaining interpolation parameter information indicating an interpolation parameter, and determining an interpolated height corresponding to each voiceprint point based on the interpolation parameter information and the determined height of the respective voiceprint point.

6. The method according to claim 5, further comprising:
    determining a predetermined value as the height of the respective voiceprint point in response to a determination that the average volume value is less than the first volume threshold.

7. The method according to claim 1, wherein the message bar after the target trigger operation comprises a progress indicator slider, the progress indicator slider distinguishing a played voiceprint region from an unplayed voiceprint region in the spectrogram, and the played voiceprint region and the unplayed voiceprint region are displayed differently.

8. The method according to claim 7, wherein the target trigger operation comprises a first playback trigger operation; and
the performing audio progress control on the audio data in response to the target trigger operation on the message bar, and performing the display control on the spectrogram based on the audio progress comprises:
performing voice playback on the audio data in response to the first playback trigger operation on the message bar, recording an audio playback progress of the audio data, and displaying the progress indicator slider in the spectrogram according to the audio playback progress.

9. The method according to claim 7, wherein the target trigger operation comprises a pause trigger operation; and
the performing audio progress control on the audio data in response to the target trigger operation on the message bar, and performing the display control on the spectrogram based on the audio progress comprises:
stopping performing voice playback on the audio data in response to the pause trigger operation on the message bar, and recording a stop timestamp of a location of the progress indicator slider during stopping.

10. The method according to claim 7, wherein the target trigger operation comprises a second playback trigger operation; and
the performing audio progress control on the audio data in response to the target trigger operation on the message bar, and performing the display control on the spectrogram based on the audio progress comprises:
performing voice playback from a location of a stop timestamp in the audio data in response to the second playback trigger operation on the message bar.

11. The method according to claim 7, wherein the target trigger operation comprises a drag trigger operation; and
the performing audio progress control on the audio data in response to the target trigger operation on the message bar, and performing the display control on the spectrogram based on the audio progress comprises:
obtaining a first timestamp of a dragged progress indicator slider in the audio data in response to the drag trigger operation on the progress indicator slider in the message bar, displaying text information of audio data corresponding to the first timestamp in a first text display region corresponding to the spectrogram, and performing region update on the played voiceprint region and the unplayed voiceprint region according to the dragged progress indicator slider; and
obtaining a second timestamp of the progress indicator slider in the audio data in response to a determination that the drag trigger operation has ended, and performing voice playback from a location of the second timestamp in the audio data.

12. The method according to claim 2, wherein the generating the spectrogram corresponding to the audio data comprises:
generating a to-be-processed spectrogram corresponding to the audio data according to the quantity of the plural voiceprint points and the corresponding heights;
obtaining a sound parameter corresponding to the audio data, and selecting a voiceprint shape type matching the sound parameter from a spectrogram library; and
generating the spectrogram corresponding to the audio data according to the voiceprint shape type and the to-be-processed spectrogram.

13. The method according to claim 2, wherein the generating the spectrogram corresponding to the audio data comprises:
obtaining a message bar display type corresponding to the audio data, and extracting a voiceprint display parameter matching the message bar display type; and
generating the spectrogram corresponding to the audio data according to the voiceprint display parameter, the quantity of the plural voiceprint points, and the corresponding heights.

14. The method according to claim 1, further comprising:
converting the audio data into first text data in response to a text conversion trigger operation on the message bar, and displaying the first text data in a second text display region corresponding to the spectrogram; and
performing text type conversion processing on the first text data in response to a translation trigger operation on the first text data, to obtain second text data, and displaying the second text data in the second text display region.

15. A data processing apparatus including an instant messaging application, comprising:
processing circuitry configured to
obtain audio data from an instant messaging application, and obtain sampled volume data corresponding to the audio data based on a sampling frequency;
generate a spectrogram corresponding to the audio data according to the audio data and the sampled volume data, and output a message bar comprising the spectrogram and the audio data, the spectrogram comprising plural voiceprint points, each having a corresponding height determined by
obtaining an average volume value of sampled volume data corresponding to the respective voiceprint point;
in response to a determination that the average volume value is greater than or equal to a first volume threshold and less than a second volume threshold, determining the height of the respective voiceprint point according to a linear growth function between volume and height; and
in response to a determination that the average volume value is greater than or equal to the second volume threshold, determining the height of the respective voiceprint point according to a logarithmic growth function between volume and height; and
perform audio progress control on the audio data in response to a target trigger operation on the message bar, and perform display control on the spectrogram based on an audio progress.

16. The apparatus according to claim 15, wherein the processing circuitry is further configured to:
determine a quantity of the plural voiceprint points corresponding to the audio data according to audio duration corresponding to the audio data.

17. The apparatus according to claim 15, wherein the processing circuitry is further configured to:
convert the audio data into first text data in response to a text conversion trigger operation on the message bar, and display the first text data in a second text display region corresponding to the spectrogram; and
perform text type conversion processing on the first text data in response to a translation trigger operation on the first text data, to obtain second text data, and display the second text data in the second text display region.

18. The apparatus according to claim 15, wherein the message bar after the target trigger operation comprises a progress indicator slider, the progress indicator slider distinguishing a played voiceprint region from an unplayed voiceprint region in the spectrogram.

19. The apparatus according to claim 18, wherein the played voiceprint region and the unplayed voiceprint region are displayed differently.

20. A non-transitory computer-readable storage medium, storing instructions that, when executed by at least one processor, cause the at least one processor to perform:

obtaining audio data from an instant messaging application, and obtaining sampled volume data corresponding to the audio data based on a sampling frequency;

generating a spectrogram corresponding to the audio data according to the audio data and the sampled volume data, and outputting a message bar comprising the spectrogram and the audio data, the spectrogram comprising plural voiceprint points, each having a corresponding height determined by obtaining an average volume value of sampled volume data corresponding to the respective voiceprint point;

in response to a determination that the average volume value is greater than or equal to a first volume threshold and less than a second volume threshold, determining the height of the respective voiceprint point according to a linear growth function between volume and height; and in response to a determination that the average volume value is greater than or equal to the second volume threshold, determining the height of the respective voiceprint point according to a logarithmic growth function between volume and height; and performing audio progress control on the audio data in response to a target trigger operation on the message bar, and performing display control on the spectrogram based on an audio progress.

\* \* \* \* \*